US012481897B2

(12) United States Patent
Holloway et al.

(10) Patent No.: US 12,481,897 B2
(45) Date of Patent: *Nov. 25, 2025

(54) MERGED RECOMMENDATIONS OF REAL ESTATE LISTINGS

(71) Applicant: MFTB Holdco, Inc., Seattle, WA (US)

(72) Inventors: Todd Holloway, San Francisco, CA (US); David Hatch, San Anselmo, CA (US); Susan Lin, Burlingame, CA (US); Brandon Blanchard, Oakland, CA (US)

(73) Assignee: MFTB Holdco, Inc., Seattle, WA (US)

( * ) Notice: Subject to any disclaimer, the term of this patent is extended or adjusted under 35 U.S.C. 154(b) by 1300 days.

This patent is subject to a terminal disclaimer.

(21) Appl. No.: 17/003,073

(22) Filed: Aug. 26, 2020

(65) Prior Publication Data

US 2025/0328969 A1  Oct. 23, 2025

Related U.S. Application Data

(63) Continuation of application No. 15/133,818, filed on Apr. 20, 2016, now Pat. No. 10,789,658, which is a continuation of application No. 13/797,363, filed on Mar. 12, 2013, now Pat. No. 9,361,583.

(51) Int. Cl.
| G06F 16/9535 | (2019.01) |
| G06F 16/2457 | (2019.01) |
| G06F 16/9032 | (2019.01) |
| G06F 16/9537 | (2019.01) |
| G06Q 50/16 | (2024.01) |

(52) U.S. Cl.
CPC ....... G06Q 50/16 (2013.01); G06F 16/24575 (2019.01); G06F 16/24578 (2019.01); G06F 16/90324 (2019.01); G06F 16/9535 (2019.01); G06F 16/9537 (2019.01)

(58) Field of Classification Search
CPC ..... G06F 16/335; G06F 16/9535; G06N 5/02; G06N 5/04; G06Q 30/0631; G06Q 50/16
See application file for complete search history.

(56) References Cited

U.S. PATENT DOCUMENTS

| 7,113,917 | B2 | 9/2006 | Jacobi et al. |
| 7,333,943 | B1 | 2/2008 | Charuk |
| 7,505,921 | B1 | 3/2009 | Lukas |
| 7,822,631 | B1 | 10/2010 | Vander Mey |
| 8,145,661 | B1 | 3/2012 | Medina |
| 8,806,024 | B1 | 8/2014 | Francis |
| 9,122,758 | B1 | 9/2015 | Blower |
| 9,361,583 | B1 | 6/2016 | Holloway |
| 10,789,658 | B1 | 9/2020 | Holloway |
| 2001/0021914 | A1 | 9/2001 | Jacobi et al. |

(Continued)

OTHER PUBLICATIONS

Non-Final Office Action in U.S. Appl. No. 13/797,363, mailing date Feb. 20, 2015, 19 pages.

(Continued)

*Primary Examiner* — Luis A Sitiriche
(74) *Attorney, Agent, or Firm* — Merchant & Gould P.C.

(57) ABSTRACT

A system for recommending comprises an interface and a processor. An interface is configured to receive an input. The input is stored and associated with two user identifiers. The processor is configured to make recommendations based at least in part on the input.

22 Claims, 22 Drawing Sheets

(56) References Cited

U.S. PATENT DOCUMENTS

| | | |
|---|---|---|
| 2002/0052805 A1 | 5/2002 | Serki |
| 2002/0143609 A1 | 10/2002 | Magouirk |
| 2003/0182249 A1 | 9/2003 | Buczak |
| 2006/0172267 A1 | 8/2006 | Roell |
| 2008/0120396 A1 | 5/2008 | Jayaram |
| 2008/0133344 A1 | 6/2008 | Hyder |
| 2009/0164400 A1 | 6/2009 | Amer-Yahia |
| 2009/0240686 A1* | 9/2009 | Murali ............... G06F 16/955 707/999.005 |
| 2009/0327863 A1 | 12/2009 | Holt |
| 2010/0042460 A1 | 2/2010 | Kane |
| 2010/0057530 A1 | 3/2010 | Parivash |
| 2011/0137818 A1 | 6/2011 | Goad |
| 2011/0173095 A1 | 7/2011 | Kassaei |
| 2012/0036015 A1 | 2/2012 | Sheikh |
| 2012/0036523 A1 | 2/2012 | Weintraub |
| 2012/0159337 A1 | 6/2012 | Travilla |
| 2012/0179543 A1 | 7/2012 | Luo |
| 2012/0221505 A1 | 8/2012 | Evans |
| 2013/0024391 A1 | 1/2013 | Vakil |
| 2013/0325623 A1 | 12/2013 | Balduf |
| 2014/0025670 A1 | 1/2014 | Daran |

OTHER PUBLICATIONS

Final Office Action in U.S. Appl. No. 13/797,363, mailing date Nov. 4, 2015, 27 pages.
Notice of Allowance in U.S. Appl. No. 13/797,363, mailing date Feb. 26, 2016, 10 pages.
Non-Final Office Action in U.S. Appl. No. 15/133,818, mailing date May 14, 2019, 22 pages.
Final Office Action in U.S. Appl. No. 15/133,818, mailing date Sep. 3, 2019, 28 pages.
Non-Final Office Action in U.S. Appl. No. 15/133,818, mailing date Jan. 31, 2020, 34 pages.
Notice of Allowance in U.S. Appl. No. 15/133,818, mailing date May 271, 2020, 34 pages.

* cited by examiner

User Browsing History — 300

| Creator ID | Target ID | Weight | Time | Effective Weight |
|---|---|---|---|---|
| imbanks | imbanks | 1.0 | 2592012 | 0.5 |
| imbanks | imbanks | 0.4 | 2592012 | 0.2 |
| imbanks | imbanks | -5.0 | 2592012 | -2.5 |
| csimak | imbanks | 1.0 | 0122013 | 1.0 |
| csimak | imbanks | 1.0 | 0122013 | 1.0 |
| hharrison | hharrison | 0.1 | 3022012 | 0.08 |
| hharrison | hharrison | 1.0 | 3022012 | 0.8 |
| hharrison | hharrison | 0.4 | 3022012 | 0.32 |
| hharrison | hharrison | -5.0 | 3022012 | -4.0 |
| hharrison | aevv | 1.0 | 3032012 | 0.8 |
| hharrison | aevv | 1.0 | 3032012 | 0.8 |
| hharrison | aevv | 0.3 | 3032012 | 0.24 |
| imbanks | aevv | 1.0 | 2592012 | 0.5 |
| imbanks | aevv | 0.1 | 2592012 | 0.05 |
| aevv | aevv | -5.0 | 3422012 | -4.75 |
| aevv | aevv | 1.0 | 3422012 | 0.95 |
| aevv | aevv | 0.3 | 3422012 | 0.285 |
| jms | jms | 1.0 | 0052012 | 0.3 |
| jms | jms | 0.4 | 0052012 | 0.12 |
| jms | jms | -5.0 | 0052012 | -1.5 |
| jms | jms | 1.0 | 0052012 | 0.3 |

Social Control Panel

Received Lists:

☒ 11/11/12 hharrison@trulia.com

☐ 09/01/12 jms@trulia.com

Shared List Default Behavior hharrison@trulia.com  Save All
jms@trulia.com  Ignore All Received Browsing Sessions:

☒ 12/21/12 iasimov@trulia.com     Weight 0.5

☒ 01/12/13 aevv@trulia.com        Weight 1.0

Shared Browsing Session Default Behavior

All Users   Use Browsing Session

Fig. 12

MERGED RECOMMENDATIONS OF REAL ESTATE LISTINGS

CROSS-REFERENCE TO RELATED APPLICATION(S)

This application is a continuation of U.S. patent application Ser. No. 15/133,818 filed Apr. 20, 2016 (now U.S. Pat. No. 10,789,658), which is a continuation of U.S. patent application Ser. No. 13/797,363 filed Mar. 12, 2013 (now U.S. Pat. No. 9,361,583), the disclosures of which are incorporated herein by reference in their entireties.

BACKGROUND

An Internet-based real estate listing system includes a recommendations engine for making recommendations to a user. For instance, as the user uses the system to view real estate listings, the recommendations engine receives indications of the user's likes and dislikes. The recommendations engine then uses those likes and dislikes to determine a set of listings to recommend to the user. As the user continues to use the system and creates a more extensive history, the recommendations become more accurately targeted to the user.

The real estate decision-making process is fundamentally a social one, with a decision typically not made by a buyer on his or her own, but by a family with the assistance of a real estate agent.

BRIEF DESCRIPTION OF THE DRAWINGS

Various embodiments of the invention are disclosed in the following detailed description and the accompanying drawings.

FIG. 3 is a diagram illustrating an embodiment of a user browsing history.

FIG. 12 is a diagram illustrating an embodiment of a social control panel.

DETAILED DESCRIPTION

Figure 1:
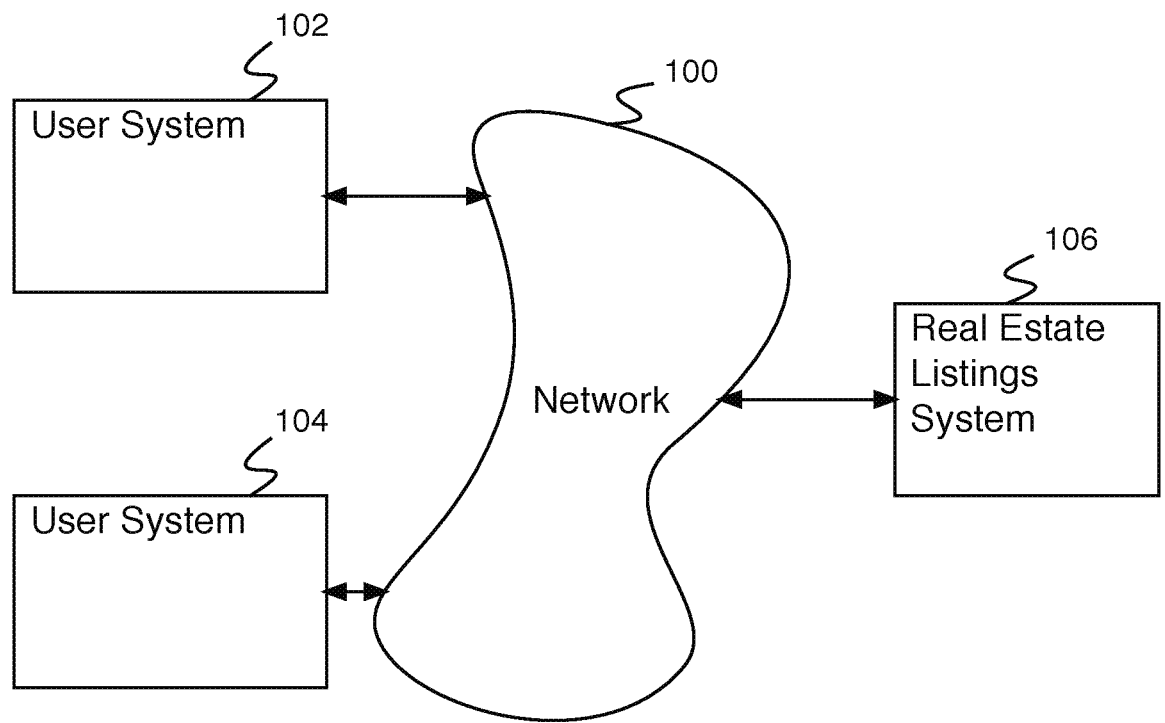
FIG. 1 is a block diagram illustrating an embodiment of a system for merged recommendations of real estate listings.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Merged recommendations of real estate listings is disclosed. A system for recommending comprises an interface configured to receive an input, wherein the input is associated with two user identifiers, and a processor configured to make recommendations based at least in part on a stored set of inputs. The system for recommending additionally comprises a memory coupled to the processor and configured to provide the processor with instructions.

A system for merged recommendations of real estate listings comprises a real estate listings server and a set of users. The real estate listing server delivers real estate listings and makes recommendations to each of the users based on their history. The real estate listing server comprises a recommendations engine for making recommendations based on a stored user browsing history. Merged recommendations of real estate listings allows a user to share input into the recommendations engine with another user, facilitating social real estate decision-making. Each time a user interacts with the real estate listing server (e.g., views a property, 'Like's a property, etc.) an indication of the interaction is added to the browsing history in order to improve the quality of recommendations made for the user. Interactions include explicit actions (e.g., clicking 'Like', 'Save', or 'Hide' for a listing) and implicit actions (e.g., viewing a property, viewing additional photos of a property, not viewing a property when presented with it as a recommendation, etc.). Explicit actions are direct indicators of preference. In some embodiments, an indicator of preference comprises a user pressing buttons expressing negative preference or positive preference, where the button is labeled accordingly. A positive button may, for example, be labeled 'like' or 'follow' or 'save' or have the likeness of a thumb pointed up. A negative button may, for example, be labeled 'hide' or 'dislike' or 'meh' or take on the likeness of a thumb pointed down. In some embodiments, an indicator of preference comprises an indication within a range of preference—for example, a user making an indication using a widget that allows for the expression of a range of preference, such as a star rating. The indication of the interaction stored in the browser history includes a user identifier, an interaction type, an interaction weight, an interaction time, etc. Merged recommendations of real estate listings adds a second user identifier to each interaction recorded in the browsing history. The second user identifier corresponds to a target user, e.g., the user whose browsing history the interaction should be added to. A user can thus make a set of actions targeted for another user's browsing history, and thus affect the recommendations shown to them in a desired way.

In some embodiments, a first user makes recommendations for a second user. For example, while browsing the first user indicates (e.g., recommends using a pull down menu with names of other users) that a property should be shown to a second user (e.g., that a second user would like the property). The second user can see other users that have indicated properties that should be shown to them (e.g., the user sees a list on a tab in the user display of recommended properties).

In some embodiments, two different user interaction modes are used with merged recommendations of real estate listings. In the first, a first user makes a list of properties for a second user (e.g., a list of properties they feel the second user would be interested in). When the list is complete, the list is sent to the second user, who can accept the list into their browsing history or ignore it. A user may also set defaults, for instance to automatically accept lists sent by their real estate agent or ignore lists from their uncle. In the second user interaction mode, a first user turns on a shared browsing session targeted at a second user. The first user then browses the real estate listings as they normally would, but the interactions will be applied to the second user's browsing history. This allows all of the explicit and implicit browsing interactions made by the first user to be shared. After the shared browsing session is completed, it is delivered to the second user, who can then decide whether to accept it into his browsing history. When a shared list or browsing session is created, the creator may additionally decide to share it with multiple users (e.g., an agent can make a "list of the week" and share it with all of their clients). Multiple inputs to the browsing history are thus created, one for each target. A social control panel allows a user to toggle inclusion of shared lists and browsing sessions, experimenting with the recommendations generated for different history sets. For instance, "What will the recommendations be if I only include history sent by my agent?" or "What happens if I stop including that list sent by my mother?" The social control panel additionally allows defaults to be set or changed. In various embodiments, other user interaction modes that take advantage of merged recommendations of real estate listings (e.g., of two user identifiers stored with each interaction recorded in the browsing history) are used, including a first user indicating a single action is to be shared with a second user, a first user programming and storing a set of interactions to be shared later with any appropriate other users, real-time shared browsing (e.g., any action the first user takes is immediately added to the second user's browsing history), co-browsing (e.g., two users logged in from separate locations each see both their own screen and the other's screen, and any action either user takes is added to both users' browsing histories), or any other appropriate user interaction mode.

FIG. 1 is a block diagram illustrating an embodiment of a system for merged recommendations of real estate listings. In the example shown, the system comprises network 100. In various embodiments, network 100 comprises one or more of the following: a local area network, a wide area network, a wired network, a wireless network, the Internet, an intranet, a storage area network, or any other appropriate communication network. User system 102 and user system 104 comprise computing systems for operation by users. In some embodiments, one or more of user system 102 and user system 104 comprises a system accessed by a user directly (e.g., the user is in proximity with the user system). In some embodiments, one or more of user system 102 and user system 104 comprises a system accessed by a user remotely (e.g., the user is not in proximity with the user system, and accesses the user system via network 100 and a separate user system). User system 102 and user system 104 comprise systems accessing real estate listings system 106 (e.g., accessing real estate listings system 106 via network 100). In various embodiments, there are 2, 5, 22, 122, 4320, 26100, 136500, or any other appropriate number of user systems accessing real estate listings system 106. Real estate listings system 106 comprises a system for providing real estate listings (e.g., a website). In some embodiments, real estate listings system 106 comprises a system for providing real estate listing recommendations. In some embodiments, real estate listings system 106 comprises a system for providing real estate recommendations based at least in part on recommendations made by one user for another user (e.g., by a real estate agent for a client, by a relative for a buyer, etc.). In some embodiments, real estate listings system 106 comprises a system for providing real estate listing recommendations based on shared history (e.g., history created by one user accessing real estate listings system 106 via user system 102 and shared with another user accessing real estate listings system 106 via user system 104). In various embodiments, real estate listings system 106 comprises a computer, a computer with multiple processors, multiple computers connected via a local network, multiple computers connected via a wide area network, multiple computers connected via the Internet, multiple computers connected via network 100, or any other appropriate computing system or systems. In various embodiments, the processors comprising user system 102, user system 104, and real estate listings system 106 comprise any one of a variety of proprietary or commercially available single or multi-processor systems (e.g., an Intel™-based processor) or other type of commercially available processor able to support communications in accordance with each particular embodiment and application.

Figure 2:
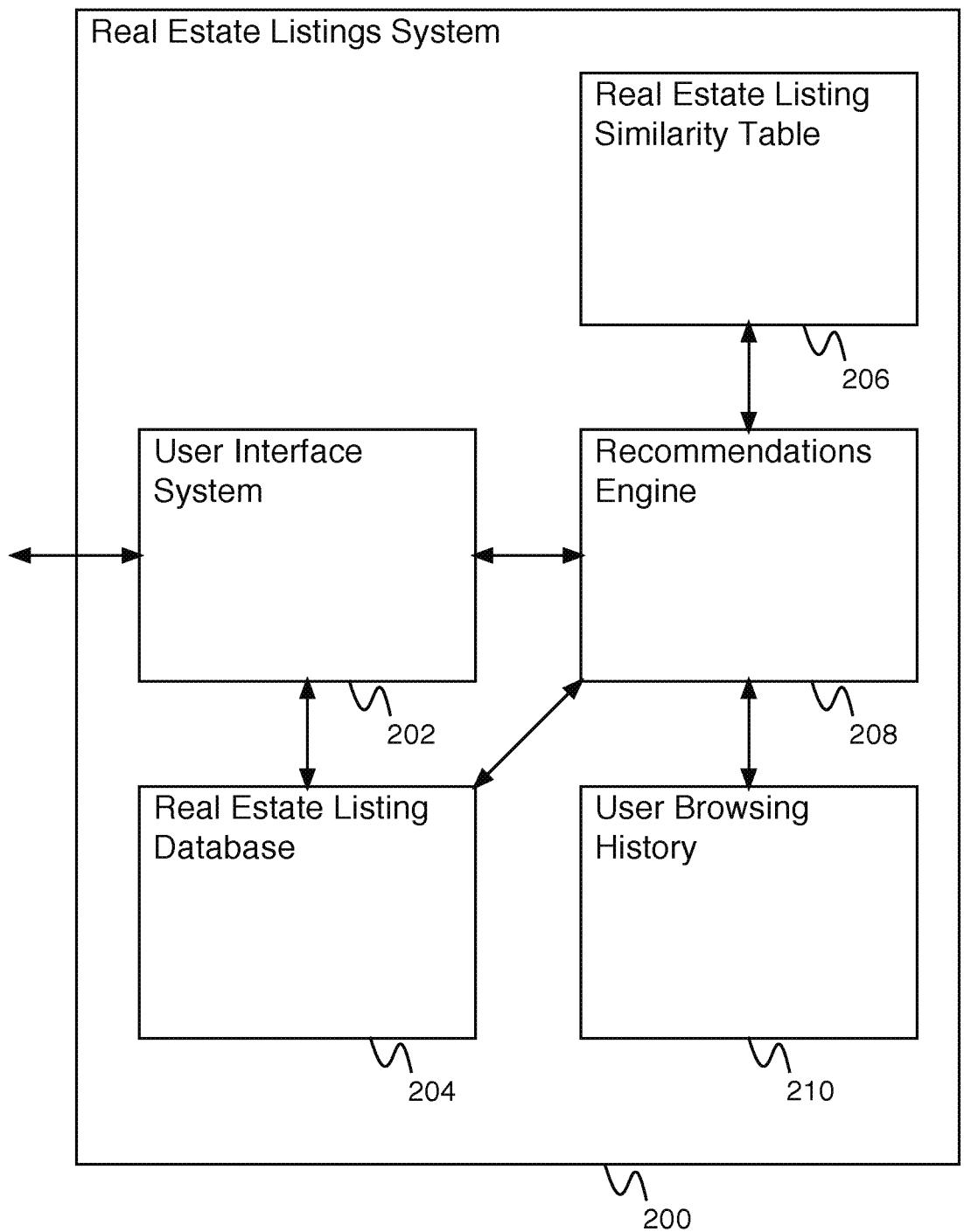
FIG. 2 is a block diagram illustrating an embodiment of a real estate listings system.

FIG. 2 is a block diagram illustrating an embodiment of a real estate listings system. In some embodiments, real estate listings system 200 comprises real estate listings system 106 of FIG. 1. In the example shown, real estate listings system 200 comprises user interface system 202, real estate listing database 204, real estate listing similarity table 206, recommendations engine 208, and user browsing history 210. User interface system 202 comprises a user interface system for providing real estate listings and recommendations and receiving user actions. In some embodiments, user interface system 202 comprises a system for providing World-Wide-Web pages over a network. In various embodiments, user actions comprise implicit actions (e.g., viewing real estate listings, viewing pictures, browsing recommendations lists, etc.), like or dislike actions (e.g., clicking 'Like', 'Save', or 'Hide'), or any other appropriate actions. In some embodiments, 'like' comprises an indication of favorability of a property. In some embodiments, 'save' comprises an indication of more favorability when compared to 'like' and to store in a list the property for being able to quickly access the property at a later time. In some embodiments, 'hide' comprises an indication of non-favorability of a property when compared to 'like.' When user interface system 202 receives a user action it takes the appropriate action and provides the appropriate response (e.g., when a user clicks on a property, user interface system 202 retrieves the property listing page from real estate listing database 204 and delivers it to the user). In addition, user interface system 202 delivers an indication of the user action to recommendations engine 208. Recommendations engine 208 records the indication of the action in user browsing history 210. In some embodiments, user actions are stored in user browsing history 210 associated with relative weights determined by the action type (e.g., clicking 'Like' on a property has a weight of 1, clicking on an image of a property has a weight of 0.3, clicking 'Hide' on a property has a weight of −5, etc.). In some embodiments, the weights associated with user actions decay over time (e.g., an action taken a month ago has considerably less weight than an action taken five minutes ago). In some embodiments, the weights associated with user actions decay exponentially over time. In some embodiments, weights are not directly assigned to user actions, rather the user actions are provided as inputs into a function which predicts the preference of a user towards a property. In various embodiments, the function is machine learned using an algorithm such as a Support Vector Machine, Adaboost, or Gradient Boosted Decision Trees, or any other appropriate combination of the above. In various embodiments, the function is linear or nonlinear, or any other appropriate function.

Recommendations engine 208 comprises a system for receiving a set of indications of user actions (e.g., indications of user actions received from user interface system 202 and stored in user browsing history 210) and a set of real estate listings (e.g., real estate listings stored in real estate listing database 204) and providing a set of real estate recommendations (e.g., an ordered subset of the received set of real estate listings) based on the set of indications of user actions. In some embodiments, recommendations engine 208 provides recommendations in real-time (e.g., when recommendations engine 208 receives a new action from user interface system 202, new recommendations are immediately generated and provided to the user). In some embodiments, recommendations engine 208 provides recommendations to users through the medium of electronic mail or as notifications on mobile computing devices or an application on mobile computing devices. In some embodiments, recommendations engine 208 displays recommendations to users on a web property (e.g., a web property owned by Trulia such as www.trulia.com). In some embodiments, recommendations engine 208 displays recommendations to users on web properties operated by a partner (e.g., a partner of Trulia). In some embodiments, recommendations engine 208 uses real estate listing similarity values stored in real estate listing similarity table 206 when generating a set of real estate recommendations. In some embodiments, the values stored in similarity table 206 are computed using one of many correlation measures—for example, a Pearson correlation. Recommendations engine 208 uses information stored in user browsing history 210 to determine which properties a user most liked, then uses information stored in real estate listing similarity table 206 to determine which properties are most similar to those the user most liked. The recommendations comprise the real estate listings ranked the highest by the product of the user like value and the real estate similarity value. In some embodiments, real estate listing similarity table is computed offline (e.g., at night or at another low-usage time) and need not be recomputed each time recommendations are determined, speeding the determination of new recommendations.

In some embodiments, two lists of recommendations are provided to a user by recommendations engine 208. A first list of recommendations (e.g., "user based recommendations") comprises recommendations determined as described above, by ranking the product of the user like value and the real estate similarity value. A second list of recommendations (e.g., "property based recommendations") comprises recommendations determined by ranking the similarity of properties to the property currently being viewed by the user. This can be read directly from real estate similarity table 206, and is equivalent to the list of user based recommendations if the property being viewed is the only one the user likes. In this way, if the user likes the property being viewed, he already has on screen a list of similar properties; if not he can ignore the list of similar properties and pay attention to the user based recommendations.

In some embodiments, interactions can be shared between users. In some embodiments, sharing interactions between users comprises merged recommendations of real estate listings. When recommendations engine 208 stores an indication of a browsing action, it stores along with the indication two user identifiers. The first user identifier comprises a user identifier associated with the user making the interaction, and the second user identifier comprises a user identifier associated with a target user. In normal usage of real estate listings system 200 (e.g., not sharing interactions between users), the first user identifier and the second user identifier comprise the same user identifier. When a first user desires to share interactions with a second user, the first user makes an appropriate indication to user interface system 202, and subsequent interactions have the user identifier of the first user stored as the user making the action and the user identifier of the second user stored as the target user.

FIG. 3 is a diagram illustrating an embodiment of a user browsing history. In some embodiments, user browsing history 300 comprises user browsing history 210 of FIG. 2. In the example shown, user browsing history 300 comprises columns for creator ID (e.g., creator identifier), target ID (e.g., target identifier), weight, time, and effective weight.

Each row of user browsing history comprises an interaction recorded in user browsing history 300 by a recommendations engine (e.g., by recommendations engine 208 of FIG. 2). In various embodiments, creator IDs and target IDs comprise real estate listings system IDs (e.g., login names), email addresses, real names, social security numbers, or any other appropriate IDs. Some rows indicate that the creator ID and target ID associated with the interaction are the same ID, indicating that the user made the interaction for himself. Some rows indicate that the creator ID and target ID associated with the interaction are different, indicating that the user made the interaction for a different user. Each interaction has an associated weight, depending on the type of interaction (e.g., a weight of 1.0 indicates the user clicked 'Like', a weight of −5.0 indicates the user clicked 'Hide', a weight of 0.3 indicates the user clicked to view an additional photo of the listing, etc.). Each interaction has an associated time, indicating the time when the interaction occurred. In the example shown, a year and day of year are recorded for each interaction. In various embodiments, a day, date, year, time, or any other appropriate time information is recorded for each interaction. Each interaction finally has an effective weight determined from the interaction weight and interaction time, representing decay of the interaction weights over time. Interactions that occurred a longer time in the past have a smaller effective weight. In some embodiments, interaction weights decay exponentially. In some embodiments, different interaction types decay with different exponential time constants (e.g., implicit actions decay faster than explicit actions). In some embodiments, interaction weights decay as the sum of multiple exponentials with different time constants.

Figure 4A:
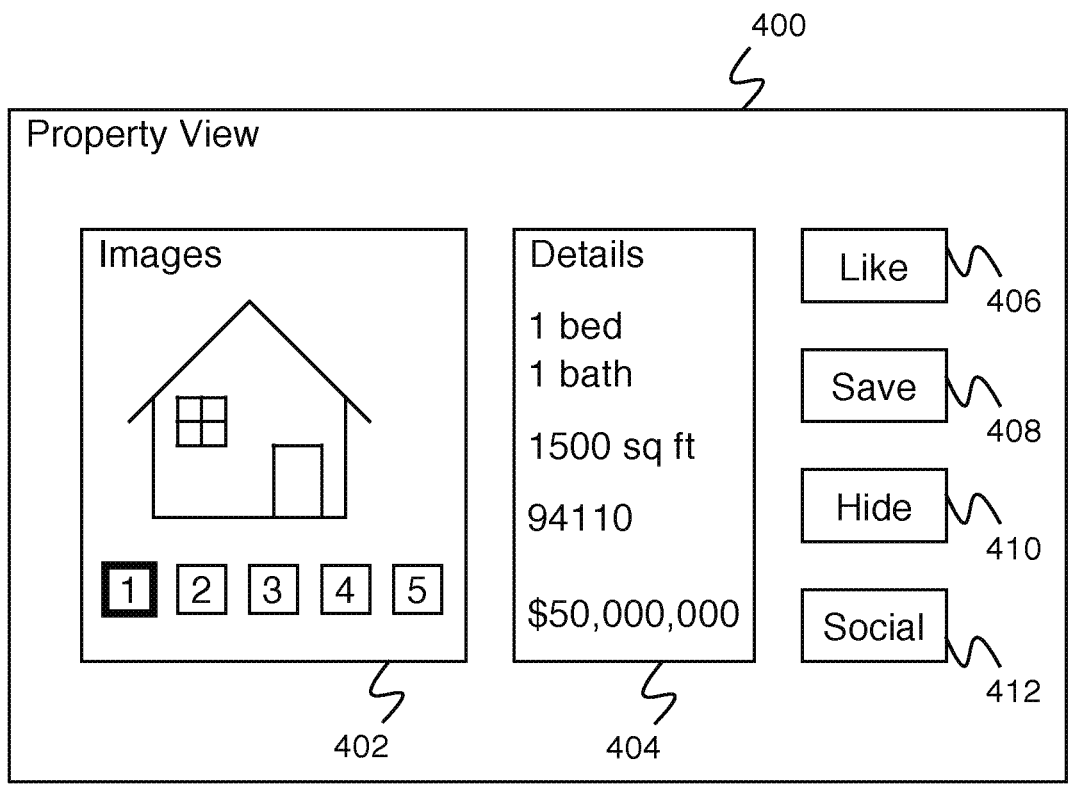
FIG. 4A is a diagram illustrating an embodiment of a user interface for a property view in a real estate listings system.

FIG. 4A is a diagram illustrating an embodiment of a user interface for a property view in a real estate listings system. In some embodiments, property view 400 is provided by user interface system 202 of FIG. 2 for viewing a property. Property view 400 comprises images 402. In some embodiments, images 402 displays an image of the property. In some embodiments, images 402 includes a selection of multiple images of the property for display (e.g., accessible to the user by clicking hyperlinks, radio buttons, selecting from a menu, etc.). Property view 400 additionally comprises details 404. Details 404 includes a set of relevant property details (e.g., property bedrooms and bathrooms, property square footage, property zip code, property price, property school district, property sale history, etc.). Property view 400 additionally comprises like button 406. When a user clicks on like button 406 the user interface system makes an indication to the recommendations engine that the user likes the property, influencing future recommendations. Property view 400 additionally comprises save button 408. When a user clicks on save button 408 the user interface system adds the property to a list of saved properties, allowing the user to easily view the property again. Additionally, the user interface system makes an indication to the recommendations engine that the user wants to save the property, influencing future recommendations. A user saving a property typically has a higher weight in the recommendations engine than a user liking a property. Property view 400 additionally comprises hide button 410. When a user clicks on hide button 410 the user interface system adds the property to a list of hidden properties that are not shown in search or recommendation results. Additionally, the user interface system makes an indication to the recommendations engine that the user is not interested the property, influencing future recommendations. Property view 400 additionally comprises social button 412. When a user clicks on social button 412 a menu of social sharing options is brought up.

Figure 4B:
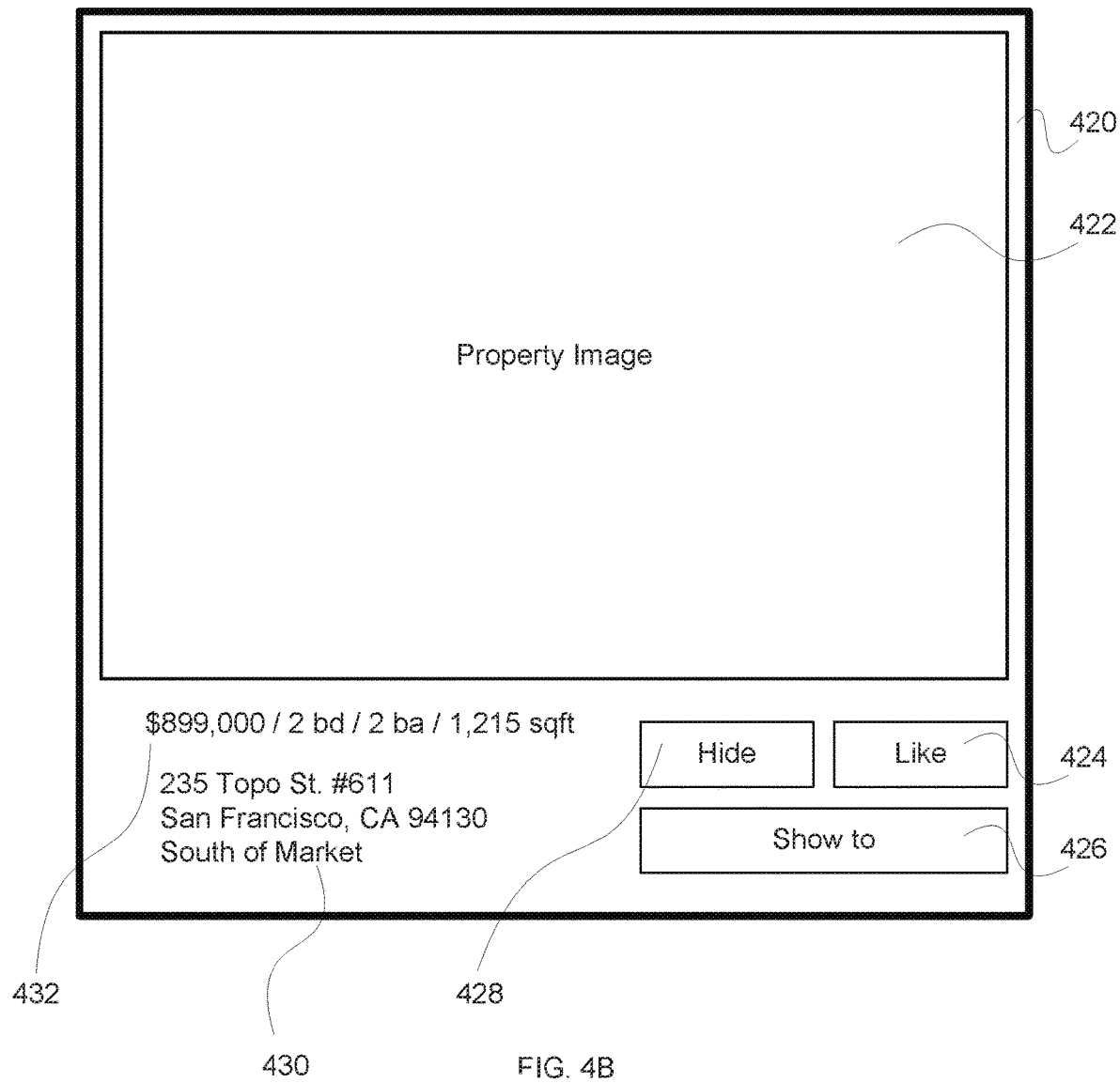
FIG. 4B is a diagram illustrating an embodiment of a property display.

FIG. 4B is a diagram illustrating an embodiment of a property display. In some embodiments, the property display in FIG. 4B is an alternate to property view 400 in FIG. 4A. In the example shown, property display 420 displays property characteristics including property image 422, property statistics 432, and property location 430. Property image 422 shows a view of the property—for example, an interior view or an exterior view. Property statistics 432 includes property information—for example, a listing price, a number of bedrooms, a number of bathrooms, an interior square footage, a property area, etc. Property location 430 includes location information—for example, a street address, a unit number, a city name, a state name, a zip code, a neighborhood name, etc. Property display 420 includes action buttons hide 428, like 424, and show to 426. Action button hide 428 indicates that the property associated with property display 420 is added to a hide group. Action button like 424 indicates that the property associated with property display 420 is added to a like group. Action button show to 426 indicates that the property associated with property display 420 is added to a show to group.

Figure 4C:
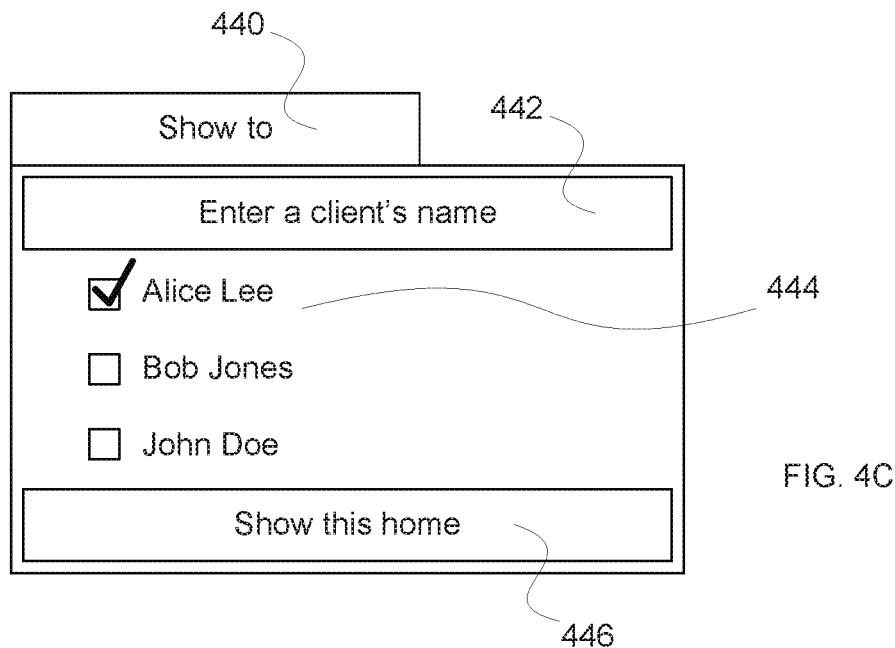
FIG. 4C is a diagram illustrating an embodiment of a show to display.

FIG. 4C is a diagram illustrating an embodiment of a show to display. In some embodiment, the show to display of FIG. 4C is a display that is shown to a user after selection of show to 426 of FIG. 4B. In the example shown, show to 440, after activation by selection or pressing button 440, includes list 444 of names and boxes to check, enter a client's name field 442, and button show this home 446. Show this home 446 button, when activated by pressing show this home button 446, shows the property to the checked name(s) of list 444.

Figure 4D:
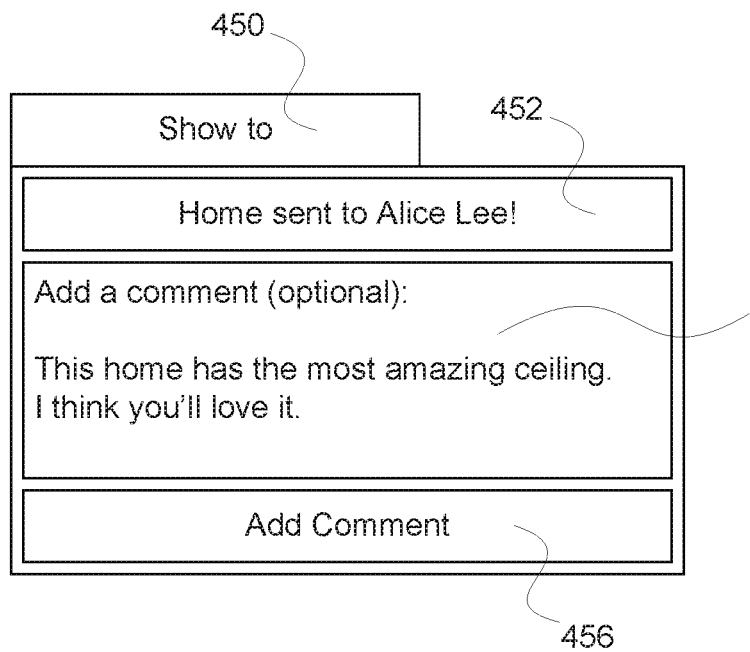
FIG. 4D is a diagram illustrating an embodiment of a show to display.

FIG. 4D is a diagram illustrating an embodiment of a show to display. In some embodiments, the show to display of FIG. 4D is a display that is shown to a user after selecting to show this home to a user. In the example shown, show to 450, after pressing of the show this home button, includes notification box 452 (e.g., saying the home was sent to selected users—for example, Alice Lee), comment entry box 454, and add comment button 456. Add comment button 456, when activated by pressing add comment button 456, add a comment to the property display that is show to selected user(s).

Figure 4E:
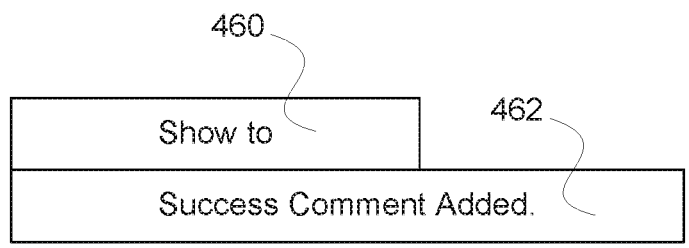
FIG. 4E is a diagram illustrating an embodiment of a show to display.

FIG. 4E is a diagram illustrating an embodiment of a show to display. In some embodiments, the show to display of FIG. 4E is a display that is shown to a user after a comment is added. In the example shown, show to 460 includes text box 462 indicating success comment added 462.

Figure 4F:
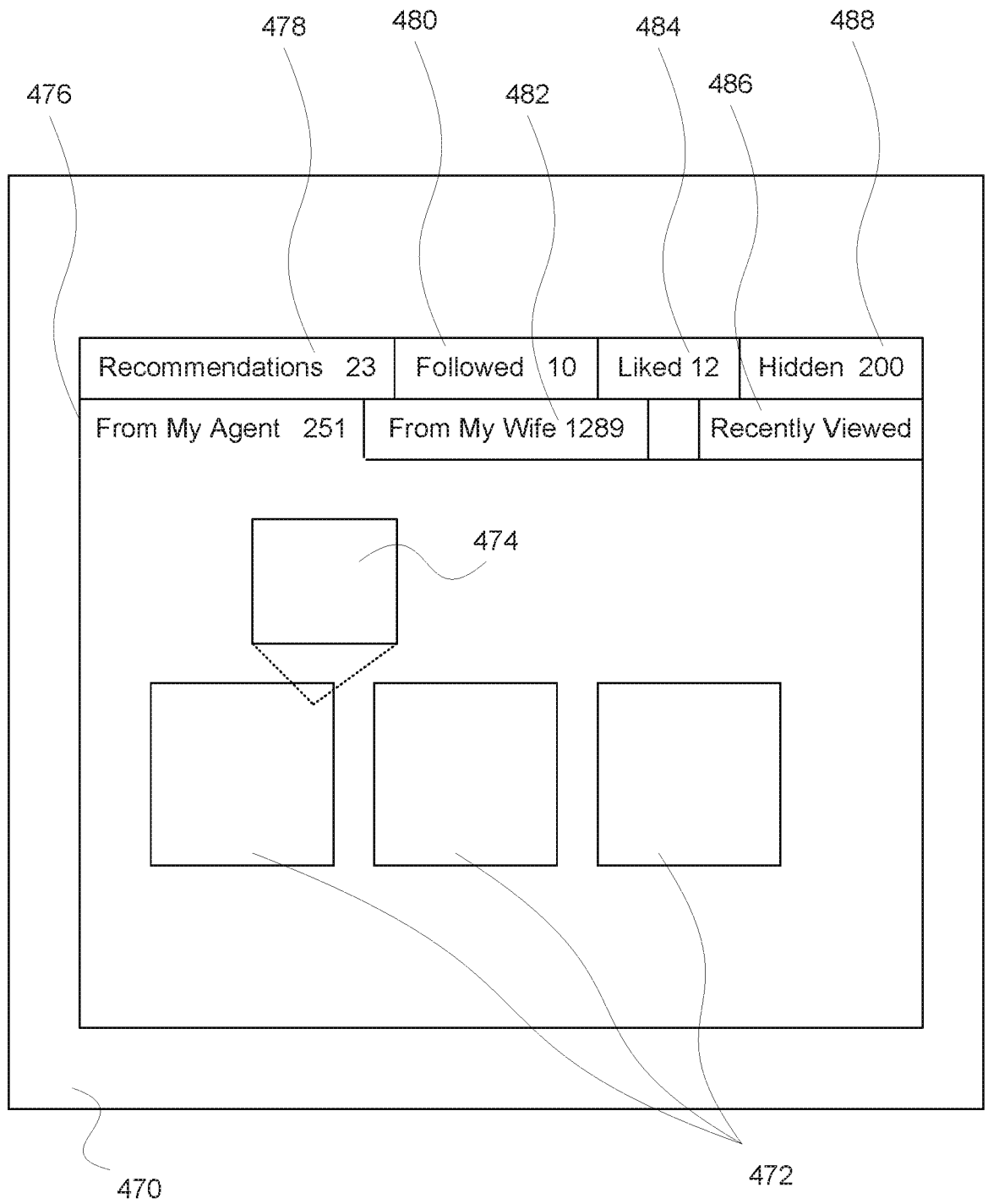
FIG. 4F is a diagram illustrating an embodiment of a user display.

FIG. 4F is a diagram illustrating an embodiment of a user display. In the example shown, user display 470 includes a plurality of groups for a user—for example, recommendations 478 with 23 properties, followed 480 with 10 properties, liked 484 with 12 properties, hidden 488 with 200 properties, from my wife 482 with 1289 properties, recently viewed 486, and selected tab from my agent 476 with 251 properties. User display 470 includes property views 472. User display 470 includes a comment box 474 associated with one of the property views 472.

Figure 5:
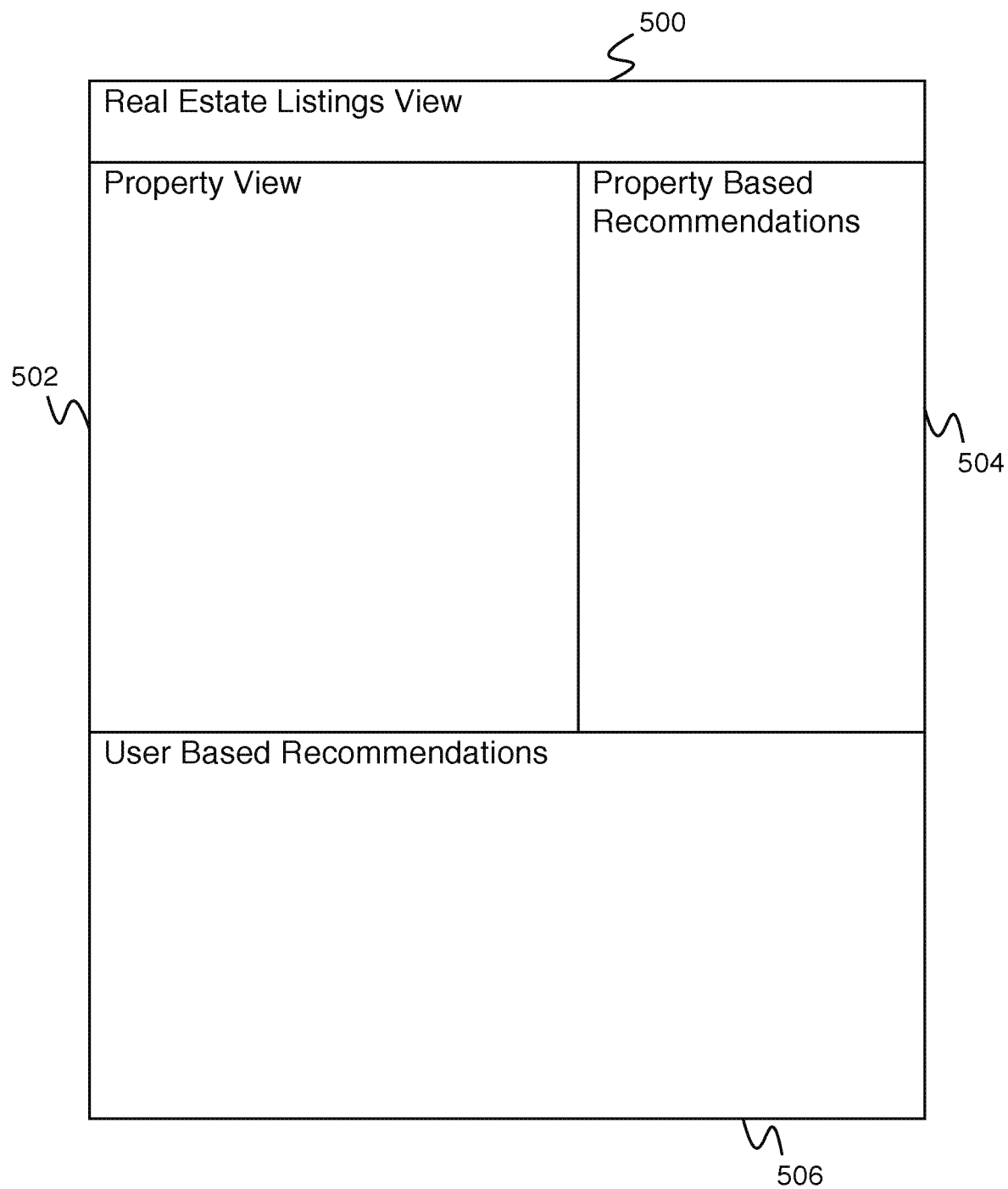
FIG. 5 is a diagram illustrating an embodiment of a layout of a real estate listings view.

FIG. 5 is a diagram illustrating an embodiment of a layout of a real estate listings view. In some embodiments, real estate listings view 500 is provided by user interface system 202 of FIG. 2 for viewing a property and search results. In some embodiments, property view 502 comprises property view 400 of FIG. 4A. In the example shown, property based recommendations 504 comprises a list of recommendations based on the property shown in property view 502 (e.g., not based on the user history). In some embodiments, property based recommendations 504 comprises a list of the most similar properties to the property shown in property view 502. User based recommendations comprises a list of recommendations based on the user history (e.g., not based on the property shown in property view 502). In some embodiments, user based recommendations are determined by determining which properties a user most liked, then determining which properties are most similar to those the user most liked. The user based recommendations comprise the real estate listings ranked the highest by the product of the user like value and the real estate similarity value or any other appropriate combination of the values.

Figure 6:
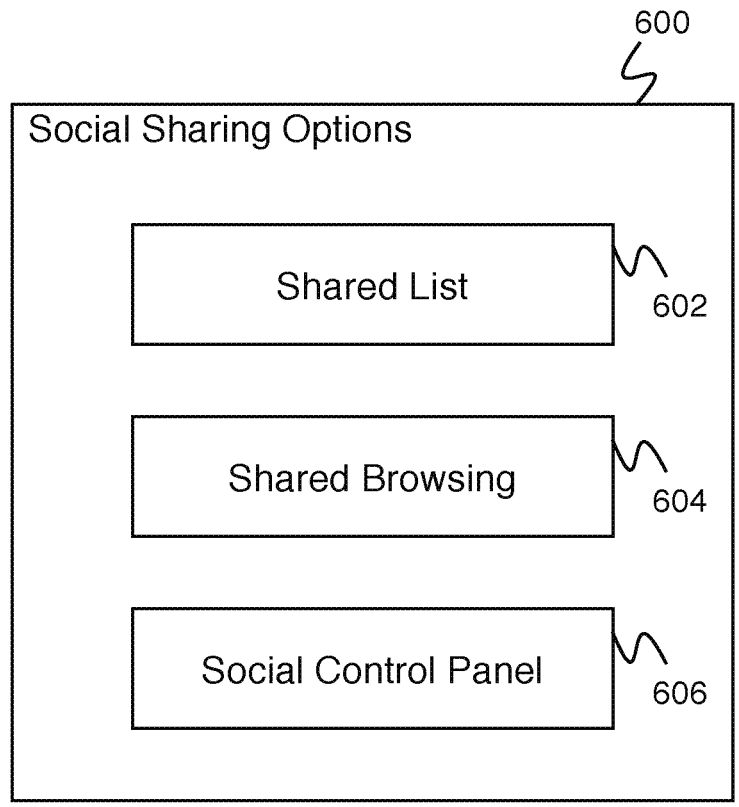
FIG. 6 is a diagram illustrating an embodiment of a social sharing options dialog box.

FIG. 6 is a diagram illustrating an embodiment of a social sharing options dialog box. In some embodiments, social sharing options dialog box is brought up when a user clicks on a social sharing button (e.g., social button 412 of FIG. 4A). In the example shown, social sharing options box 600 comprises shared list button 602 and shared browsing button 604. Shared list button 602 initiates creation of a shared list. Shared browsing button 604 initiates a shared browsing session. Social control panel button 606 brings up a social control panel.

Figure 7:
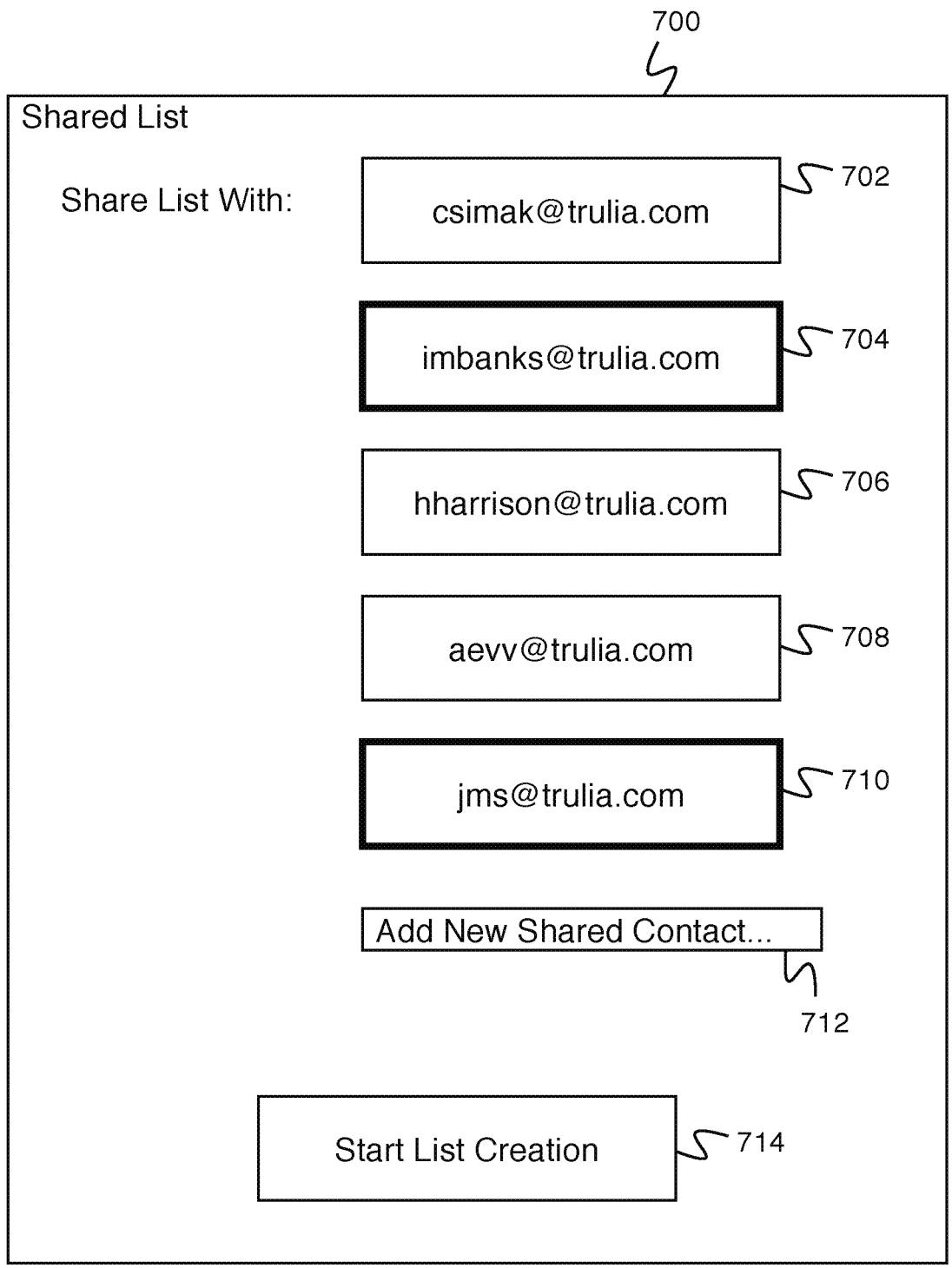
FIG. 7 is a diagram illustrating an embodiment of a shared list creation dialog box.

FIG. 7 is a diagram illustrating an embodiment of a shared list creation dialog box. In some embodiments, shared list creation dialog box 700 is brought up when a user clicks on a shared list button (e.g., shared list button 602 of FIG. 6). A user chooses one or more shared contacts to share the list with (e.g., by clicking the boxes associated with the shared contacts, e.g., csimak@trulia.com box 702, imbanks@trulia.com box 704, hharrison@trulia.com box 706, aevv@trulia.com box 708, or jms@trulia.com box 710). In the example shown, imbanks@trulia.com and jms@trulia.com are selected as recipients of the shared list. A user may add to the shared contacts by clicking add new shared contact box 712. In various embodiments, a user adds a shared contact by entering their email address, username, or any other appropriate identifier. In some embodiments, a shared contact must be confirmed by the contact before he can be added. When the user has added all desired shared contacts, he clicks start list creation box 714 to start list creation.

Figure 8:
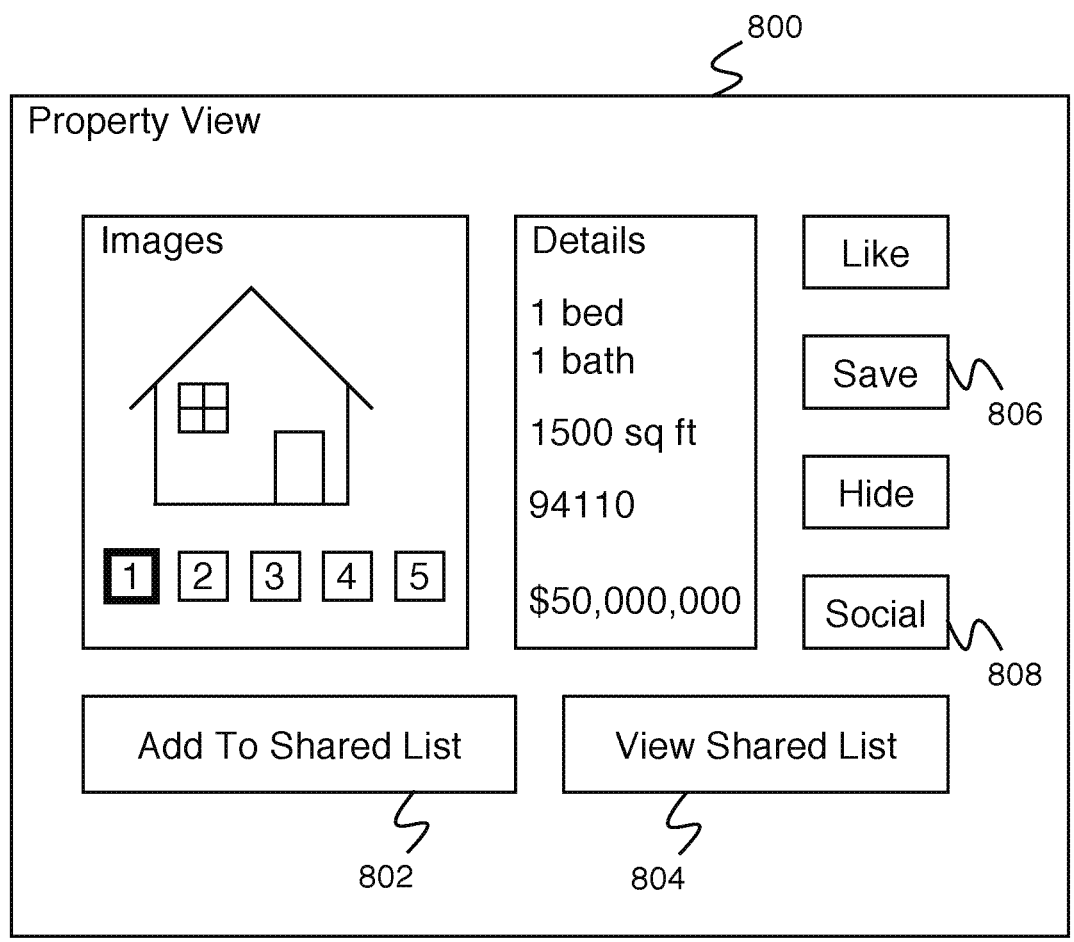
FIG. 8 is a diagram illustrating an embodiment of a user interface for shared list creation in a property view in a real estate listings system.

FIG. 8 is a diagram illustrating an embodiment of a user interface for shared list creation in a property view in a real estate listings system. In some embodiments, property view 800 comprises a modified version of property view 400 of FIG. 4A. In the example shown, property view 800 comprises add to shared list button 802. Clicking add to shared list button 802 adds the currently viewed property to the shared list being created. Property view 800 additionally comprises view shared list button 804. Clicking view shared list button 804 displays a shared list dialog box for the user comprising the current contents of the shared list. In various embodiments, the shared list dialog box additionally comprises one or more of a complete list button, a save list for later button, a cancel list creation button, a modify shared contacts button, an edit list button, or any other appropriate shared list controls. In some embodiments, add shared list button 802 is not present and save button 806 is modified during the creation of a shared list to take on the previously described function of add to shared list button 802. In some embodiments, view shared list button 804 is not present and social button 808 is modified during the creation of a shared list to take on the previously described function of view shared list button 804.

Figure 9:
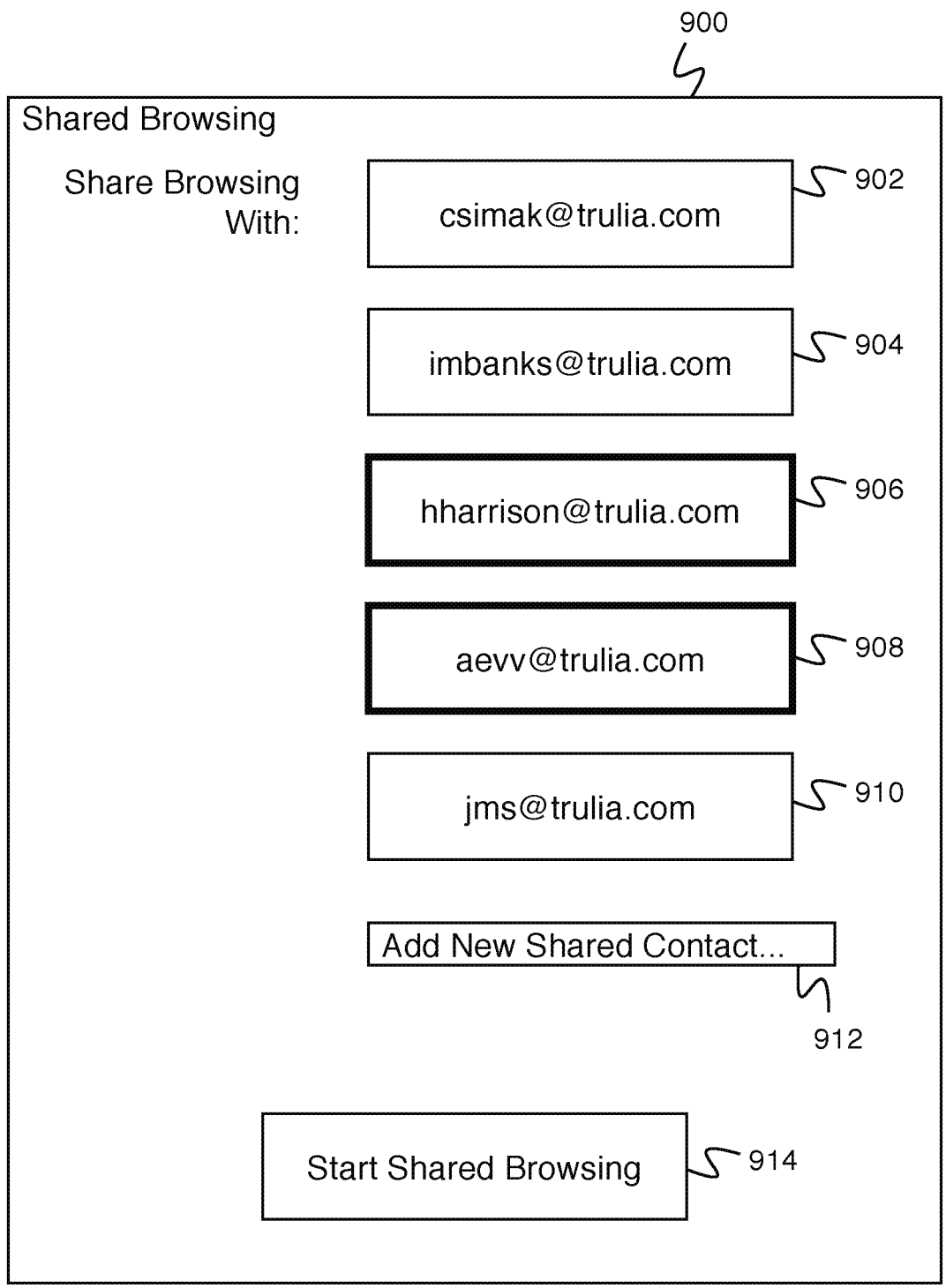
FIG. 9 is a diagram illustrating an embodiment of a shared browsing dialog box.

FIG. 9 is a diagram illustrating an embodiment of a shared browsing dialog box. In some embodiments, shared browsing dialog box 900 is brought up when a user clicks on a shared browsing button (e.g., shared browsing button 604 of FIG. 6). A user chooses one or more shared contacts to share browsing with (e.g., by clicking the boxes associated with the shared contacts, e.g., csimak@trulia.com box 902, imbanks@trulia.com box 904, hharrison@trulia.com box 906, aevv@trulia.com box 908, or jms@trulia.com box 910). In the example shown, hharrison@trulia.com and aevv@trulia.com are selected as recipients of the shared browsing. A user may add to the shared contacts by clicking add new shared contact box 912. In various embodiments, a user adds a shared contact by entering their email address, username, or any other appropriate identifier. In some embodiments, a shared contact must be confirmed by the contact before he can be added. When the user has added all desired shared contacts, he clicks start shared browsing box 914 to start shared browsing.

In some embodiments, when shared browsing has been started, a user can then browse property listings in the normal manner with views unchanged. Interactions performed by the user are stored with the shared contact as the target ID (or if browsing is shared with multiple users, multiple interactions are stored each time an interaction is performed, each one with a different shared contact as the target ID). In some embodiments, the function of the social button (e.g., social button 412 of FIG. 4A) is modified to bring up a complete shared browsing box allowing the user to end the shared browsing session. In some embodiments, a complete shared browsing button is added to the property view screen, allowing the user to end the shared browsing session directly.

Figure 10:
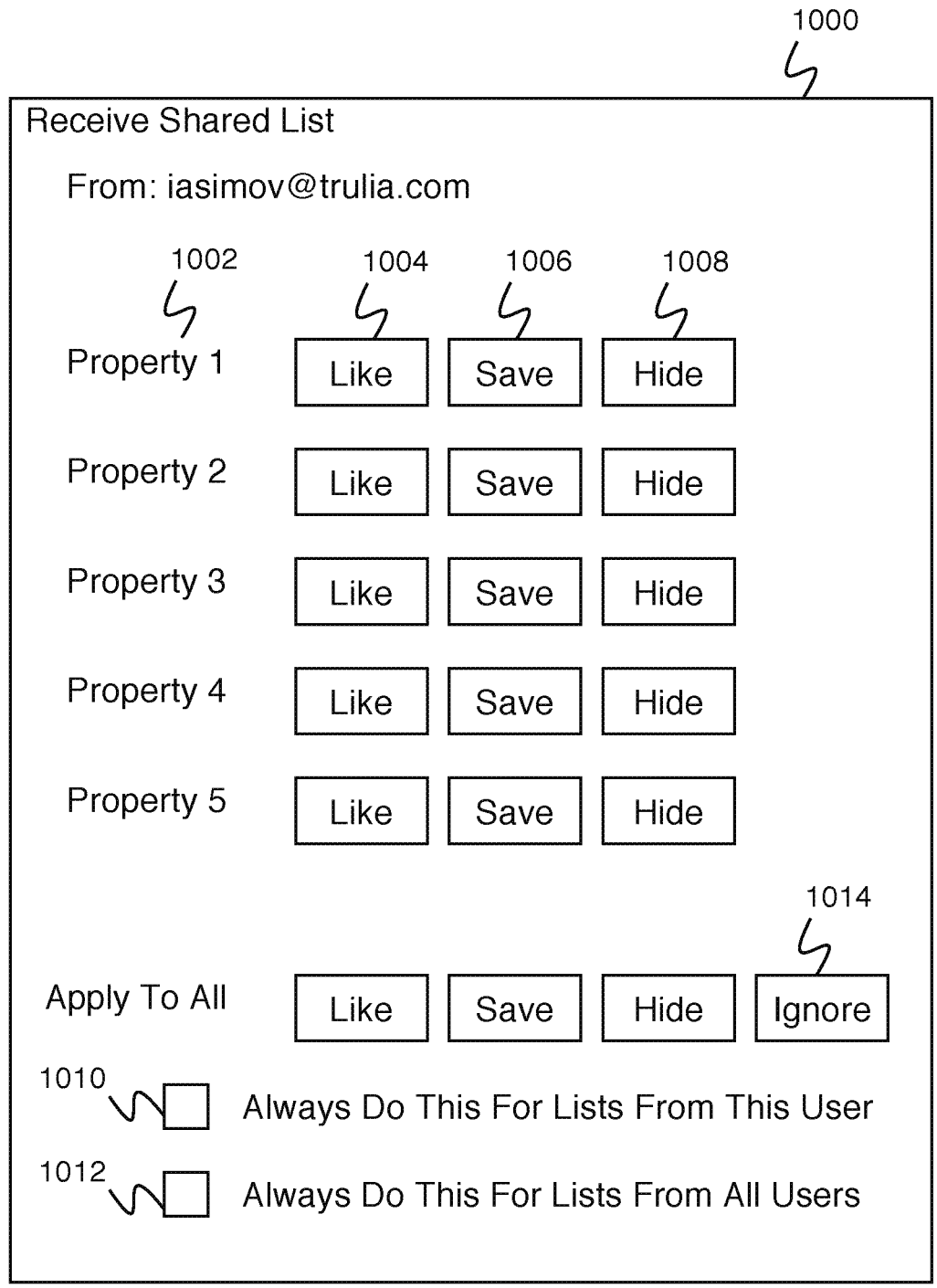
FIG. 10 is a diagram illustrating an embodiment of a receive shared list dialog box.

FIG. 10 is a diagram illustrating an embodiment of a receive shared list dialog box. In some embodiments, a user is shown a receive shared list dialog box when they receive a shared property list from another user. In the example shown, receive shared list dialog box 1000 comprises the identifier of the user sharing the list (e.g., a username, email address, real name, etc.) and a list of properties. In various embodiments, each property is shown with a property photo, property details (e.g., price, square footage, location, etc.), or any other appropriate property information. Each property name (e.g., property name 1002) comprises a link (e.g., a hyperlink) to the property view of the corresponding property. Each property name has associated like, save, and hide buttons (e.g., like button 1004, save button 1006, and hide button 1008) that allow the receiving user to like, save, or hide the property listing. The receive shared list dialog box additionally displays apply to all properties shown like, save, hide, and ignore buttons, and associated always do this for lists from this user checkbox 1010 and always do this for lists from all users checkbox 1012. A user clicking an apply to all properties shown like, save, or hide button applies that decision to all properties shown, rather than needing to click the appropriate box for each property. If a user clicks ignore all button 1014, the shared list is dismissed with no action taken for any property in the list. If the user first clicks always do this for lists from this user checkbox 1010, the apply to all decision is automatically applied to any future lists from the sending user. If the user first clicks always do this for lists from all users checkbox 1012, the apply to all decision is automatically applied to any future lists received from any user. Decisions made regarding inclusion of the list into the user's browsing history and automatic actions to take for future lists can be modified using a social control panel.

Figure 11:
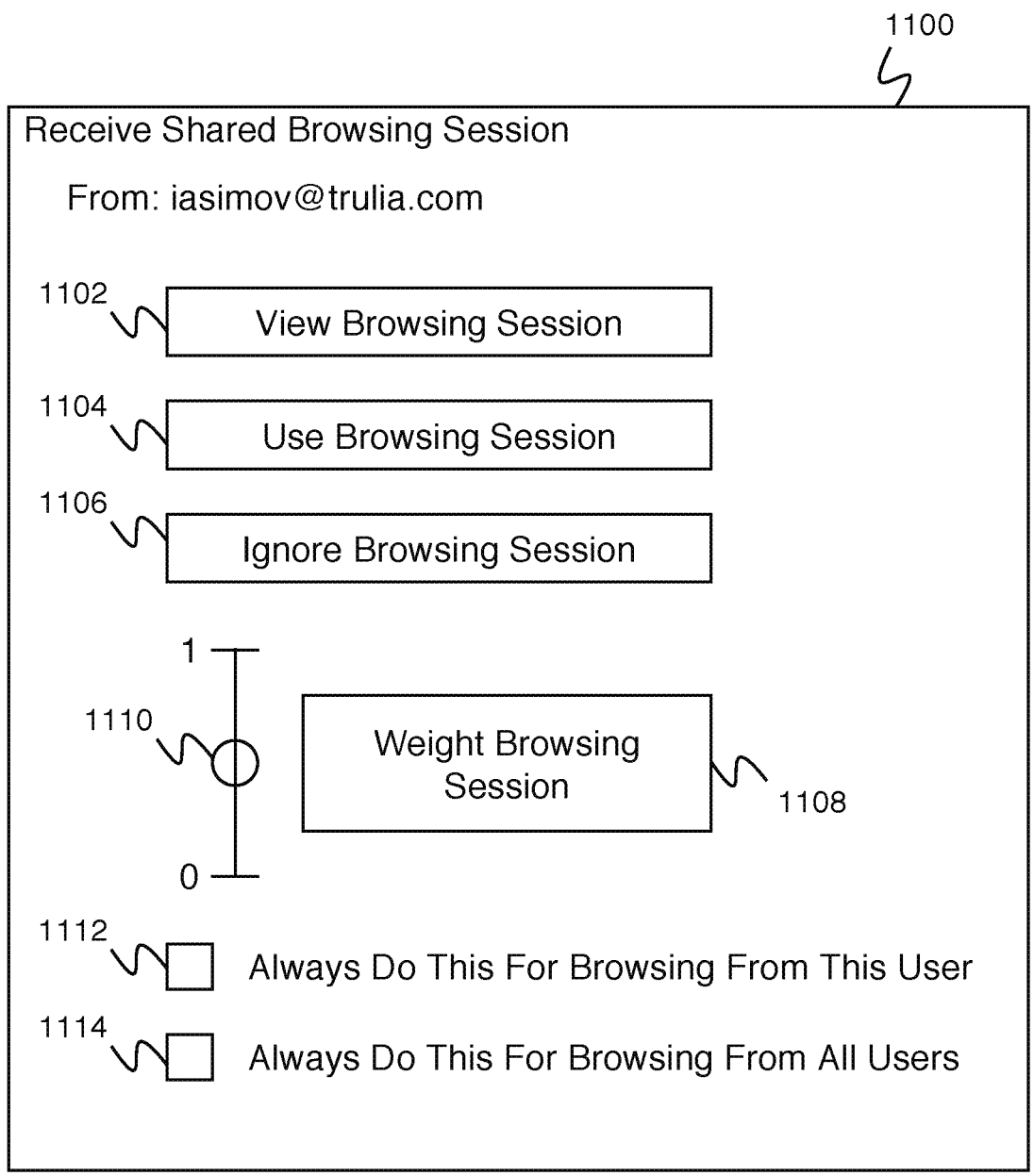
FIG. 11 is a diagram illustrating an embodiment of a receive shared browsing dialog box.

FIG. 11 is a diagram illustrating an embodiment of a receive shared browsing dialog box. In some embodiments, a user is shown a receive shared browsing dialog box with the receive a shared browsing session from another user. In the example shown, receive shared browsing dialog box comprises the identifier of the user sharing the browsing session (e.g., a username, email address, real name, etc.) and a choice of actions to take. View browsing session box 1102 displays the user a summary of the received browsing session when clicked. Use browsing session box 1104 adds the browsing session to a user's browsing history when clicked. Ignore browsing session box 1106 dismisses shared browsing session without adding it to a user's browsing history when clicked. Weight browsing session box 1108 adds the browsing session to a user's browsing history with a scaled weight when clicked. Weight slider 1110 allows a user to select the weight used for weight browsing session box 1108. If the user first clicks always do this for browsing from this user checkbox 1112, the decision is automatically applied to any future browsing sessions from the sending user. If the user first clicks always do this for browsing from all users checkbox 1114, the decision is automatically applied to any future browsing sessions received from any user. Decisions made regarding inclusion of the browsing session into the user's browsing history and automatic actions to take for future browsing sessions can be modified using a social control panel.

FIG. 12 is a diagram illustrating an embodiment of a social control panel. In some embodiments, social control panel 1200 is brought up when a user clicks on a social control panel button (e.g., social control panel button 606 of FIG. 6). In the example shown, social control panel 1200 comprises a history of received social interactions (e.g., received lists and browsing sessions) and controls for modifying their inclusion in the user browsing history. Social control panel 1200 additionally comprises a display of the default behavior upon receipt of a list or browsing session and controls for modifying the default behaviors. A list was received from hharrison@trulia.com on Nov. 11, 2012 and is included in the browsing history, and a list was received from jms@trulia.com on Sep. 1, 2012 and is not included in the browsing history. The default shared list behavior is to save all entries in lists from hharrison@trulia.com and ignore all entries in lists from jms@trulia.com. A browsing session was received from iasimov@trulia.com on Dec. 21, 2012 and is included in the browsing history with weight 0.5, and a browsing session was received from aevv@trulia.com on Jan. 12, 2013 and is included in the browsing history with weight 1.0. The default shared browsing session behavior is use the browsing session for sessions received from all users.

Figure 13:
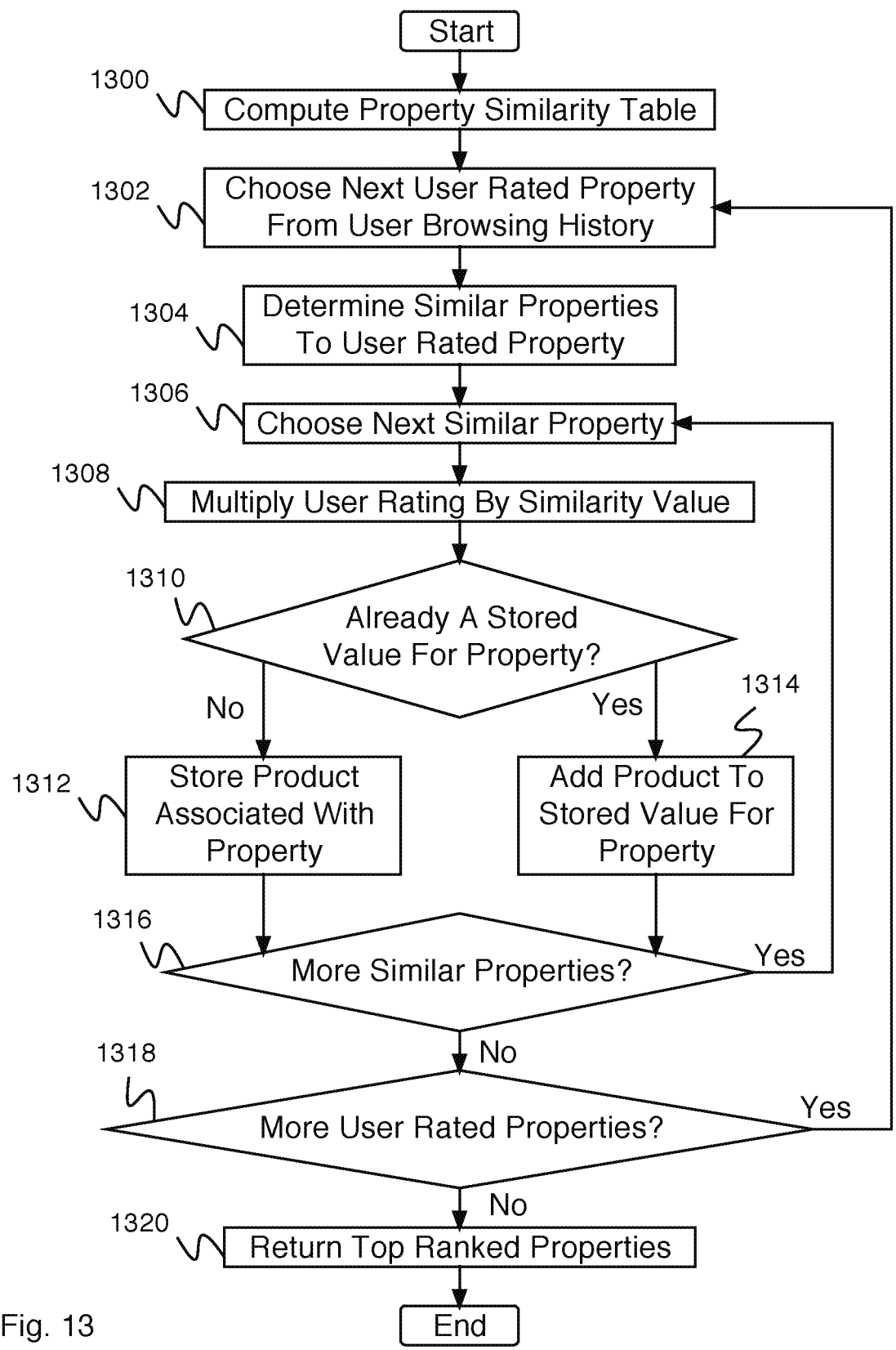
FIG. 13 is a flow diagram illustrating an embodiment of a process for providing recommendations.

FIG. 13 is a flow diagram illustrating an embodiment of a process for providing recommendations. In some embodiments, the process of FIG. 13 comprises a process for providing property recommendations to a user based on a user history and a property similarity table. In some embodiments, the process of FIG. 13 is used by recommendations engine 208 of FIG. 2 for providing recommendations. In the example shown, in 1300, a property similarity table is computed. In some embodiments, a property similarity table comprises a table with values indicating how similar each property is to each other property. In some embodiments, computing a property similarity table is performed asynchronously (e.g., the property similarity table is computed once an hour, once a day, etc., regardless of how often recommendations are provided). In 1302, the next user rated property is chosen from a user browsing history. For example, user rated properties comprise properties for which the user has interactions recorded in the user browsing history. In some embodiments, the user rating corresponding to the property comprises the weighted sum of the user interactions for that property. In some embodiments, choosing the next user rated property comprises determining the user rating for the property. In some embodiments, the next user rated property comprises the first user rated property. In 1304, similar properties to the user rated property are determined. In some embodiments, similar properties are determined by reading out the similar properties to the user rated property from the property similarity table. In some embodiments, determining similar properties to the user rated property comprises determining the similarity values for the similar properties. In 1306, the next similar property is chosen. In some embodiments, the next similar property comprises the first similar property. In 1308 the user rating (e.g., the user rating determined in 1302) is multiplied by the similarity value (e.g., the similarity value determined in 1304). In 1310 it is determined whether there is already a stored value for the property (e.g., a product of a user rating and similarity value for the property stored during a previous iteration). If it is determined that there is not already a stored value for the property, control passes to 1312. In 1312, the product (e.g., the product determined in 1308) is stored associated with the property. Control then passes to 1316. If it was determined in 1310 that there is already a stored value for the property, control passes to 1314. In 1314, the product is added to the stored value for the property. Control then passes to 1316. In 1316, it is determined whether there are more similar properties. If it is determined that there are more similar properties, control passes to 1306. If it is determined that there are not more similar properties, control passes to 1318. In 1318, it is determined whether there are more user rated properties. If it is determined that there are more user rated properties, control passes to 1302. If it is determined that there are not more user rated properties, control passes to 1320. In 1320, the top ranked properties are returned. In some embodiments, the top ranked properties comprise the properties with the highest associated stored sum of products value.

Figure 14:
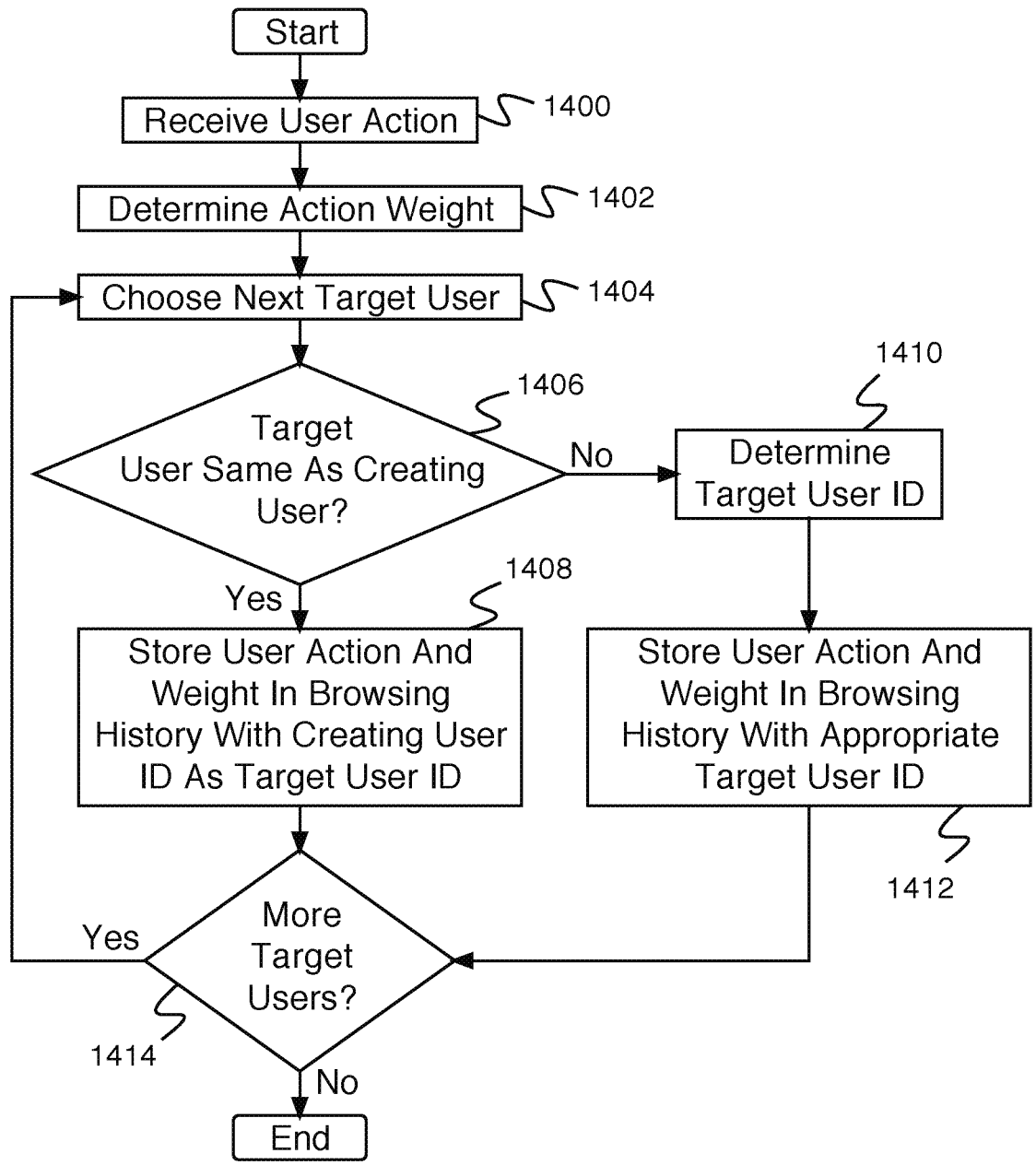
FIG. 14 is a flow diagram illustrating an embodiment of a process for storing user actions in a browsing history.

FIG. 14 is a flow diagram illustrating an embodiment of a process for storing user actions in a browsing history. In some embodiments, the process of FIG. 14 is used for storing one or more user actions with associated target users that can be different from the creating user. In some embodiments, the process of FIG. 14 is used by recommendations engine 208 of FIG. 2 for storing user actions in a browsing history. In the example shown, in 1400, a user action is received (e.g., as a result of a user performing an action). In 1402, the action weight is determined. In some embodiments, the action weight is determined by looking up the action type in an action weight table. In 1404, the next target user is chosen. In some embodiments, the set of target users is determined from the current social sharing settings (e.g., whether a shared list, browsing session, or other appropriate shared interaction operation is in progress). In some embodiments, there is only one target user. In some embodiments, the next target user is the first target user. In 1406, it is determined whether the target user is the same as the creating user. In the event it is determined that the target user is the same as the creating user, control passes to 1408. In 1408, the user action and weight are stored in the browsing history with the creating user ID as the target user ID. Control then passes to 1414. In the event it was determined in 1406 that the target user is not the same as the creating user, control passes to 1410. In 1410, the target user ID is determined. In some embodiments, the target user ID is determined from stored information describing the user. In 1412, the user action and weight are stored in the browsing history with the appropriate target user ID. Control then passes to 1414. In 1414, it is determined whether there are more target users. In the event it is determined that there are more target users, control passes to 1404. In the event it is determined that there are not more target users, the process ends.

Figure 15:
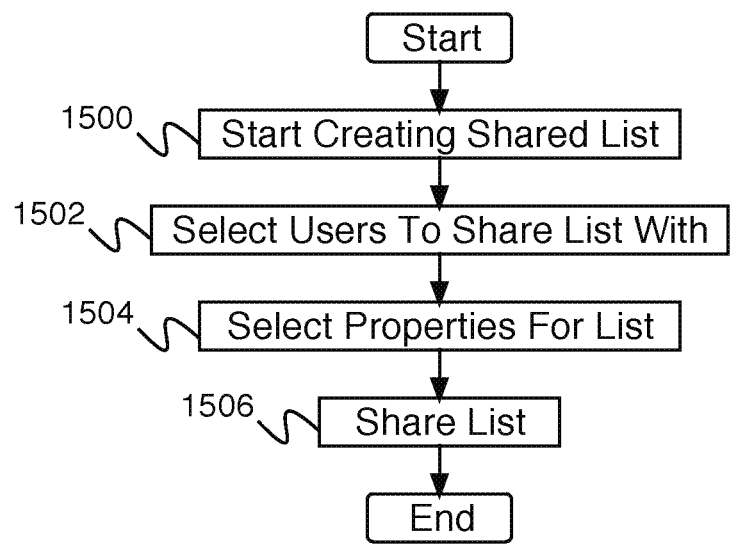
FIG. 15 is a flow diagram illustrating an embodiment of a process for creating and sharing a property list.

FIG. 15 is a flow diagram illustrating an embodiment of a process for creating and sharing a property list. In some embodiments, the process of FIG. 15 is used by a real estate listings user to create and share a list of noteworthy properties with one or more associates. In the example shown, in 1500 creating the shared list is started. In some embodiments, creating the shared list is started by clicking a shared list button. In 1502, users are selected to share the list with. In various embodiments, users are selected by entering user identifying information, by selecting users from a list or menu, by selecting a premade list of users, or by any other appropriate user selection process. In 1504, properties are selected for the list. In some embodiments, properties are selected for the list by browsing properties and clicking an add to shared list button whenever an appropriate property is found. In 1506, the list is shared. In some embodiments, sharing the list causes the creation of a shared user action for each property for each user the list is shared with.

Figure 16:
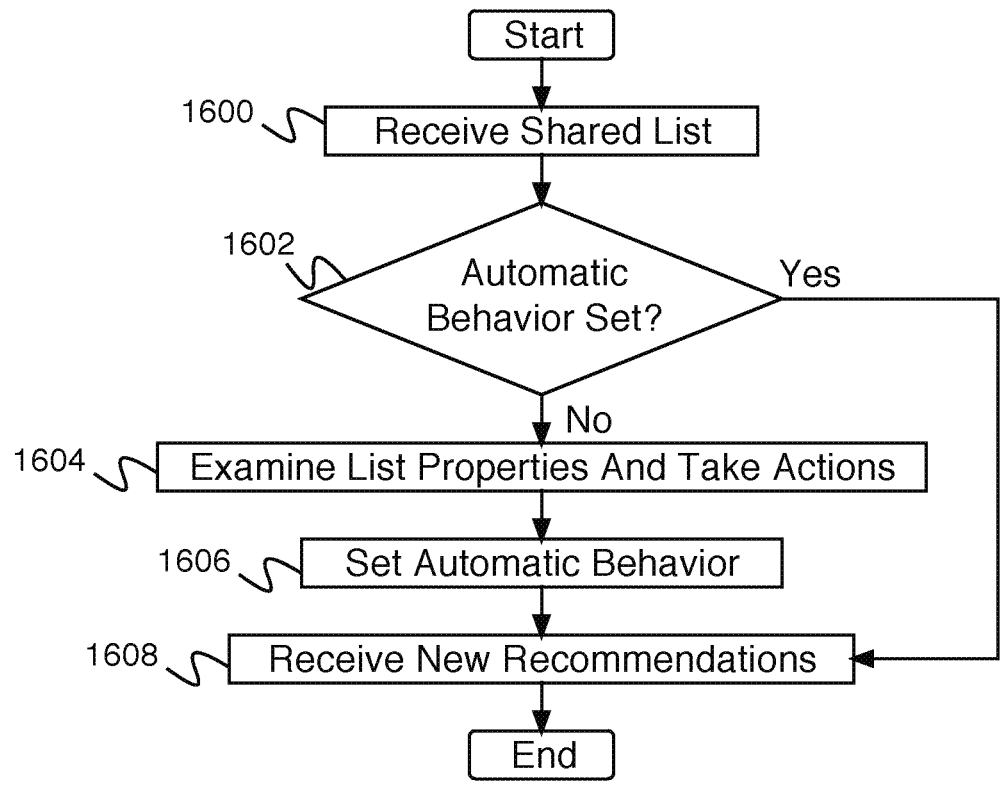
FIG. 16 is a flow diagram illustrating an embodiment of a process for receiving a shared property list.

FIG. 16 is a flow diagram illustrating an embodiment of a process for receiving a shared property list. In some embodiments, the process of FIG. 16 is used by a real estate listings user to incorporate a shared list into his browsing history. In the example shown, in 1600, a shared list is received, for example as a result of a user creating a shared list via the process of FIG. 15. In 1602, it is determined whether there is an automatic behavior set that is applicable to the shared list (e.g., an automatic behavior that applies to all users or to the user that created the shared list). If it was determined in 1602 that there is an applicable automatic behavior set, the user takes no action and control passes to 1608. If it was determined in 1602 that there is not an applicable automatic behavior set, control passes to 1604. In 1604, properties in the list are examined and actions are taken. For example, the user examines the property view page associated with each property and decides whether to like, save, or hide the property, or take no action on it. The user can also decide to perform any action for all properties in the list. In 1606, automatic behavior is set. The user sets an automatic behavior for the user sending the list or for all users, as desired. In 1608, new recommendations are received (e.g., from a recommendations engine). In some embodiments, new recommendations received take into account the new browsing history entries resulting from the shared list.

Figure 17:
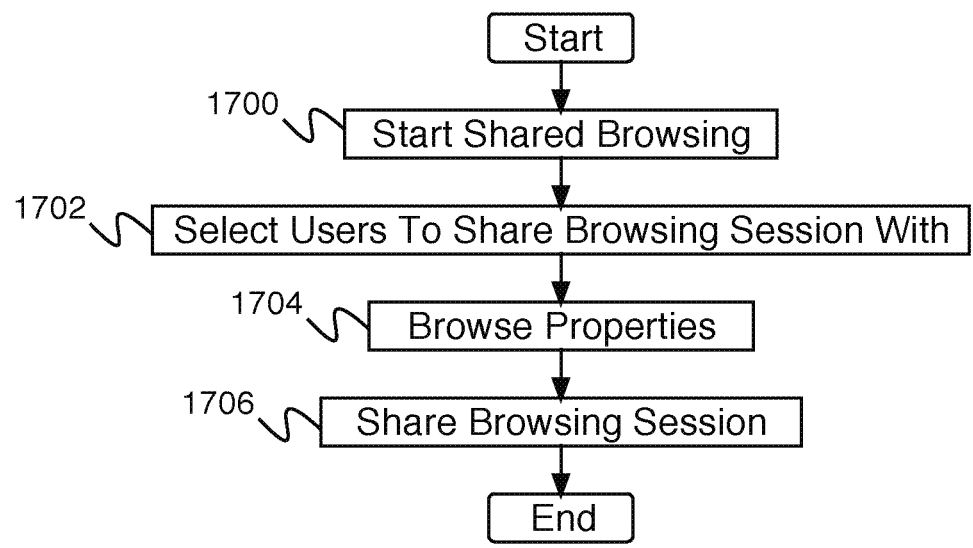
FIG. 17 is a flow diagram illustrating an embodiment of a process for creating and sharing a browsing session.

FIG. 17 is a flow diagram illustrating an embodiment of a process for creating and sharing a browsing session. In some embodiments, the process of FIG. 17 is used by a real estate listings user to create and share a set of user actions with one or more associates. In the example shown, in 1700, creating of the shared browsing session is started. In some embodiments, creating the shared browsing session is started by clicking a shared browsing button. In 1702, users are selected to share the browsing session with. In various embodiments, users are selected by entering user identifying information, by selecting users from a list or menu, by selecting a premade list of users, or by any other appropriate user selection process. In 1704, properties are browsed. In various embodiments, any appropriate actions are taken, including viewing properties, liking properties, saving properties, hiding properties, viewing property images, browsing recommendations lists, or any other appropriate actions. In 1706, the browsing session is shared. In some embodiments, sharing the browsing session causes the creation of a shared user action for each action taken for each user the browsing session is shared with.

Figure 18:
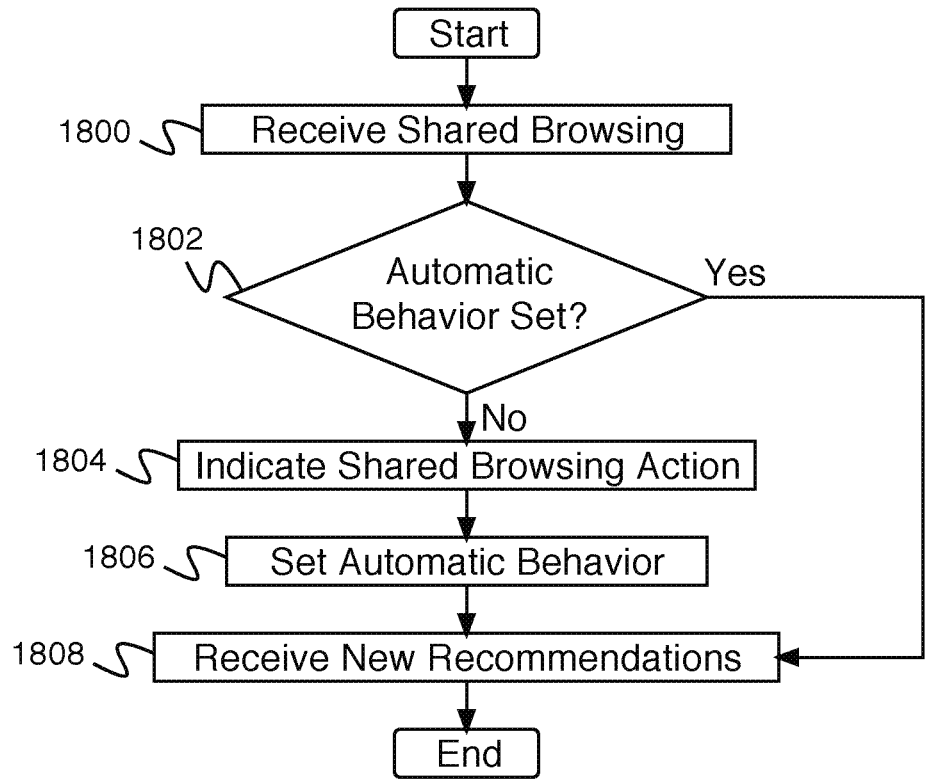
FIG. 18 is a flow diagram illustrating an embodiment of a process for receiving a shared browsing session.

FIG. 18 is a flow diagram illustrating an embodiment of a process for receiving a shared browsing session. In some embodiments, the process of FIG. 18 is used by a real estate listings user to incorporate a shared browsing session into his browsing history. In the example shown, in 1800, a shared browsing session is received. For example, as a result of a user creating a shared browsing session via the process of FIG. 17, the browsing session is received. In 1802, it is determined whether there is an automatic behavior set. For example, it is determined whether there is an automatic behavior set that is applicable to the shared browsing session (e.g., an automatic behavior that applies to all users or to the user that created the shared browsing session). If it was determined in 1802 that there is an applicable automatic behavior set, the user takes no action and control passes to 1808. If it was determined in 1802 that there is not an applicable automatic behavior set, control passes to 1804. In 1804, a shared browsing action is indicated. For example, the user decides whether to use the browsing session, ignore it, or use it with a weight. In 1806, automatic behavior is set. The user sets an automatic behavior for the user sending the browsing session or for all users, as desired. In 1808, new recommendations are received (e.g., from a recommendations engine). In some embodiments, new recommendations received take into account the new browsing history entries resulting from the shared browsing session.

Figure 19:
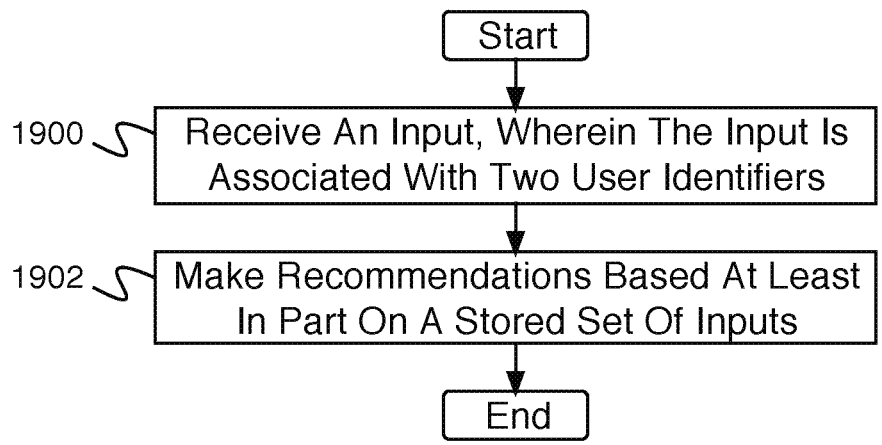
FIG. 19 is a flow diagram illustrating an embodiment of a process for making recommendations.

FIG. 19 is a flow diagram illustrating an embodiment of a process for making recommendations. In the example shown, in 1900 an input is received. The input is associated with two user identifiers. In 1902, a recommendation is made based at least in part on a stored set of inputs.

Although the foregoing embodiments have been described in some detail for purposes of clarity of understanding, the invention is not limited to the details provided. There are many alternative ways of implementing the invention. The disclosed embodiments are illustrative and not restrictive.

We claim:

1. A computer-implemented method of providing a merged recommendation of items for a first user, comprising:

retrieving a first user browsing history for the first user from a database, wherein the user browsing history includes a plurality of items;

receiving a second user browsing history for a second user;

receiving a selection on a user interface of a computing device associated with the first user to accept the second user browsing history;

upon receiving the selection to accept the second user browsing history, merging the first user browsing history and the second user browsing history to create the user browsing history;

for each item of the plurality of items,
  assigning a preference score to the item;
  assigning a similarity score to the item based at least in part on a second item associated with the user browsing history,
  in response to determining that the preference score assigned to the item is above a first threshold, that the similarity score assigned to the item is above a second threshold, and that a combination of the similarity score assigned to the item and the preference score assigned to the item is above a third threshold, adding the item to a list of recommended items; and providing the merged recommendation that includes the list of recommended items to the first user, wherein the merged recommendation is based on the first user browsing history associated with the first user and the second user browsing history associated with the second user.

2. The computer-implemented method of claim 1, wherein the first user browsing history specifies information related to interactions with a set of items, of the plurality of items, by the first user and the second user browsing history specifies information related to interactions with the set of items by the second user distinct from the first user.

3. The computer-implemented method of claim 2, further comprising:
   observing browsing interactions with the set of items, of the plurality of items, by a third user distinct from the first user and the second user; and
   generating a first recommended subset of the set of items based at least in part on (1) the first user's browsing interactions with the set of items, (2) the second user's browsing interactions with the set of items, and (3) the third user's browsing interactions with the set of items.

4. The computer-implemented method of claim 1, for each of a plurality of observed browsing interactions with a set of items by at least one user, establishing a weighting factor for the observed browsing interaction based at least in part on one or more attributes of the at least one user, wherein the adding of items to the list of recommended items is further based at least in part on the established weighting factors.

5. The computer-implemented method of claim 1, further comprising:
   receiving, from the first user, a set of defaults, wherein at least one default of the set of defaults includes an indication to automatically accept lists of recommended items sent to the first user by the second user and wherein at least one default of the set of defaults includes an indication to automatically ignore lists of recommended items sent to the first user by a third user.

6. The computer-implemented method of claim 1, further comprising:
   receiving a first user browsing interaction performed by the first user;
   determining a weight for the received first user browsing interaction;
   determining that a target user for the first user browsing interaction is the first user;
   in response to determining that the target user for the first user browsing interaction is the first user, storing an indication of the first user browsing interaction in a browsing history in association with a user id of the first user;
   receiving a second user browsing interaction performed by the first user;
   determining a weight for the received second user browsing interaction;
   determining that a target user for the second user browsing interaction is not the first user; and
   in response to determining that the target user for the second user browsing interaction is not the first user, determining a target user id, and storing an indication of the second user browsing interaction in the browsing history in association with the determined target user id.

7. The computer-implemented method of claim 1, further comprising:
   receiving, from a first user a first selection of one or more shared browsing sessions;
   in response to receiving the first selection of one or more shared browsing sessions, including the selected one or more shared browsing sessions, of the first selection, in a browsing history of the first user;
   generating a first set of recommendations based at least in part on the one or more shared browsing sessions, of the first selection, included in the browsing history of the first user;
   receiving, from the first user a second selection of one or more shared browsing sessions that is different from the first selection of one or more shared browsing sessions;
   in response to receiving the second selection of one or more shared browsing sessions, including the selected one or more shared browsing sessions, of the second selection, in the browsing history of the first user; and
   generating a second set of recommendations, that is different from the first set of recommendations, based at least in part on the one or more shared browsing sessions, of the second selection, included in the browsing history of the first user.

8. A computing system for providing a merged recommendation of items for a first user, having at least one memory and at least one processor, the memory including instructions that when executed by the at least one processor causes the computing system to:
   receive, from the first user a first selection of one or more shared browsing sessions targeted at a second user;
   in response to receiving the first selection of one or more shared browsing sessions,
      retrieve a first user browsing history for the first user;
      receive a second user browsing history for the second user;
      receive a first browsing selection on a user interface associated with the computing system to accept the second user browsing history;
      upon receiving the first browsing selection to accept the second user browsing history, include the selected one or more shared browsing sessions, of the first selection, including merging the second user browsing history with the first user browsing history of the first user;
   generate a first set of recommendations based at least in part on the one or more shared browsing sessions, of the first selection, included in the first user browsing history of the first user;
   receive, from the first user a second selection of one or more shared browsing sessions targeted at a third user that is different from the first selection of one or more shared browsing sessions;
   in response to receiving the second selection of one or more shared browsing sessions,
      retrieve the first user browsing history for the first user;
      receive a third user browsing history for the third user;
      receive a second browsing selection on the user interface associated with the computing system to accept the third user browsing history;
   upon receiving the second browsing selection to accept the third user browsing history, include the selected one or more shared browsing sessions of the second selection, including merging the third user browsing history with the first user browsing history of the first user;

generate a second set of recommendations, that is different from the first set of recommendations, based at least in part on the one or more shared browsing sessions, of the second selection, included in the browsing history of the first user.

9. The computing system of claim 8, wherein the first selection of one or more shared browsing sessions and the second selection of one or more shared browsing sessions are each received from the first user via a social control panel.

10. The computing system of claim 8, wherein the instructions when executed by the processor further cause the computing system to:

after a first shared browsing session performed by the first user and targeted at the second user is completed, send the first shared browsing session targeted at the second user to the second user.

11. The computing system of claim 10, wherein the instructions when executed by the processor further cause the computing system to:

receive input establishing an association between the first user and the second user.

12. The computing system of claim 11, wherein the received input establishing the association between the first user and the second user is received from the first user.

13. The computing system of claim 11, wherein the received input establishing the association between the first user and the second user is received from the second user.

14. The computing system of claim 10, wherein the instructions when executed by the processor further cause the computing system to:

receive, from the second user, a selection to toggle inclusion of one or more shared browsing sessions in a browsing history, of the second user, used for making recommendations, wherein the one or more shared browsing sessions includes the first shared browsing session.

15. The computing system of claim 10, wherein the instructions when executed by the processor further cause the computing system to:

to retrieve at least one user browsing history from a database; and for each item of a plurality of items, assign a preference score to the item, assign a similarity score to the item based at least in part on a second item associated with the first user browsing history, in response to determining that the preference score assigned to the item is above a first threshold, that the similarity score assigned to the item is above a second threshold, and a combination of the similarity score assigned to the item and the preference score assigned to the item is above a third threshold, add the item to a list of recommended items.

16. The computing system of claim 10, wherein the instructions when executed by the processor further cause the computing system to:

establish a weighting factor for the first user for interactions made by the second user; and apply the established weighting factor to each of a plurality of observed browsing interactions by the second user to obtain weighted interactions by the second user, wherein generating the first set of recommendations is based at least in part on (1) the first user's browsing interactions and (2) the obtained weighted interactions by the second user.

17. The computing system of claim 10, wherein the instructions when executed by the processor further cause the computing system to:

receive, from the first user, a set of defaults, wherein at least one default of the set of defaults includes an indication to automatically accept lists of recommended items sent to the first user by a fourth user and wherein at least one default of the set of defaults includes an indication to automatically ignore lists of recommended items sent to the first user by a fifth user.

18. A medium, that is not a carrier wave or transient signal, having contents configured to cause a computing system to:

receive, from a first user a first selection of one or more shared browsing sessions targeted at a second user;

in response to receiving the first selection of one or more shared browsing sessions, retrieve a first user browsing history for the first user, wherein the first user browsing history includes a plurality of items;

receive a second user browsing history for the second user;

receive a first browsing selection on a user interface associated with the computing system to accept the second user browsing history;

upon receiving the first browsing selection to accept the second user browsing history, including merging the second user browsing history with the first user browsing history of the first user to create a user browsing history;

for each item of the plurality of items, assigning a preference score to the item;

assigning a similarity score to the item based at least in part on a second item associated with the user browsing history, in response to determining that the preference score assigned to the item is above a first threshold, that the similarity score assigned to the item is above a second threshold, and that a combination of the similarity score assigned to the item and the preference score assigned to the item is above a third threshold, adding the item to a first set of recommendations; and provide the first set of recommendations based at least in part on the one or more shared browsing sessions, wherein the first set of recommendations is based on the first user browsing history of the first user and the second user browsing history associated with the second user.

19. The medium of claim 18, wherein the contents are further configured to cause the computing system to:

receive, from the first user a second selection of one or more shared browsing sessions targeted at a third user, that is different from the first selection of one or more shared browsing sessions;

in response to receiving the second selection of one or more shared browsing sessions, receive a third user browsing history for the third user;

receive a second browsing selection on the user interface associated with the computing system to accept the third user browsing history;

upon receiving the second browsing selection to accept the third user browsing history, include the selected one or more shared browsing sessions, of the second selection, including merging the third user browsing history with the user browsing history of the first user; and generate a second set of recommendations, that is different from the first set of recommendations, based at least in part on the one or more shared browsing sessions, of the second selection, included in the first user browsing history of the first user.

20. The medium of claim 18, wherein the contents are further configured to cause the computing system to:
for each recommendation of the first set of recommendations, cause a visual indication of a corresponding item to be displayed together with visual indications of items recommended based at least in part on the second user's browsing activity.

21. The medium of claim 20, wherein the contents are further configured to cause the computing system to:
for each recommendation of the first set of recommendations, cause the second user to be explicitly identified as a source of the recommendation in connection with the display of the visual indications.

22. The medium of claim 21, wherein the contents are further configured to cause the computing system to:
establish a weighting factor for the first user for interactions made by the second user; and
apply the established weighting factor to each of a plurality of observed interactions by the second user to obtain weighted interactions by the second user, wherein generating the first set of recommendations is based at least in part on (1) the first user's browsing interactions and (2) the weighted interactions by the second user.

* * * * *